US010454357B1

(12) United States Patent
Pandya

(10) Patent No.: US 10,454,357 B1
(45) Date of Patent: Oct. 22, 2019

(54) ELECTROMAGNETIC MACHINERY SYSTEMS, DEVICE, ASSEMBLIES, METHODS, PROCESSES, USES, AND APPARATUS OPERABLE AS A MOTOR OR GENERATOR WITH ONE OR MORE STATOR COILS, AT LEAST ONE PERMANENT MAGNET ROTOR, AND ASSOCIATED CIRCUITRY

(71) Applicant: Harivallabh Pandya, Bloomfield Hills, MI (US)

(72) Inventor: Harivallabh Pandya, Bloomfield Hills, MI (US)

( * ) Notice: Subject to any disclaimer, the term of this patent is extended or adjusted under 35 U.S.C. 154(b) by 0 days.

(21) Appl. No.: 16/108,646

(22) Filed: Aug. 22, 2018

Related U.S. Application Data

(60) Continuation of application No. 15/630,196, filed on Jun. 22, 2017, now Pat. No. 10,084,365, which is a division of application No. 15/015,182, filed on Feb. 4, 2016, now abandoned.

(51) Int. Cl.
| | |
|---|---|
| *H02P 8/14* | (2006.01) |
| *H02P 25/098* | (2016.01) |
| *H02P 8/00* | (2006.01) |
| *H02P 1/26* | (2006.01) |
| *H02K 47/18* | (2006.01) |
| *H02K 3/28* | (2006.01) |
| *H02K 1/27* | (2006.01) |

(52) U.S. Cl.
CPC ........... *H02K 47/18* (2013.01); *H02K 1/2793* (2013.01); *H02K 3/28* (2013.01)

(58) Field of Classification Search
CPC .. H02P 8/14; H02P 25/098; H02P 8/00; H02P 1/26
USPC .......................... 318/767, 122, 718, 724, 140
See application file for complete search history.

(56) References Cited

U.S. PATENT DOCUMENTS

| | | | |
|---|---|---|---|
| 4,221,984 A | 9/1980 | Mason | 310/112 |
| 4,358,808 A | 11/1982 | Praeg | 361/11 |
| 5,865,754 A | 2/1999 | Sevick-Muraca et al. | |
| 7,206,423 B1 | 4/2007 | Feng et al. | |
| 7,999,405 B2 | 8/2011 | Peterson | |
| 8,076,893 B2 | 12/2011 | Dong et al. | |
| 9,438,150 B2 | 9/2016 | Zheng | |
| 2008/0231144 A1 | 9/2008 | Grant | 310/339 |
| 2013/0076157 A1 | 3/2013 | Stein | 307/116 |

*Primary Examiner* — Erick D Glass

(74) *Attorney, Agent, or Firm* — Young Basile Hanlon & MacFarlane, P.C.

(57) ABSTRACT

A method for power conversion generally includes a step of generating a drive current in a first winding of an electromagnet in a motor mode. The electromagnet may be mounted spatially proximate a rotor and has a bifilar coil. The bifilar coil may have a pair of conductors that form the first winding and a second winding. The second winding may be spatially parallel to, spatially separated from, and electrically isolated from the first winding. The rotor may be rotatably mounted and has a plurality of permanent magnets. Further steps generally include rotating the rotor in response to the drive current, removing the drive current from the first winding in a generator mode and inducing a load current through the second winding to an electrical load in response to a torque applied to the rotor.

20 Claims, 6 Drawing Sheets

ELECTROMAGNETIC MACHINERY SYSTEMS, DEVICE, ASSEMBLIES, METHODS, PROCESSES, USES, AND APPARATUS OPERABLE AS A MOTOR OR GENERATOR WITH ONE OR MORE STATOR COILS, AT LEAST ONE PERMANENT MAGNET ROTOR, AND ASSOCIATED CIRCUITRY

CROSS-REFERENCE TO RELATED APPLICATIONS

This application is a continuation of U.S. Ser. No. 15/630,196, filed Jun. 22, 2017, which is a divisional of U.S. Ser. No. 15/015,182, filed Feb. 4, 2016, each of which are incorporated by reference in their entirety.

BACKGROUND

The present application relates generally to unique electromagnetic machinery and associated techniques, and more specifically (but not exclusively) relates to certain unique apparatus, applications, assemblies, configurations, devices, forms, methods, processes, systems, and uses of electromagnetic machinery operable as a motor or generator that includes one or more electromagnetic stator coils, at least one permanent magnet rotor assembly, and associated circuitry.

For any equipment or procedure primarily directed to the conversion of power from one form to another, the potential to increase conversion efficiency often comes under close scrutiny—especially to the extent the same decreases carbon dioxide emission or other possible greenhouse agent, and/or reduces consumption of a nonrenewable fuel (e.g. oil, natural gas, coal, etc.). State-of-the-art electromechanical machines are no exception, encompassing many rotary motor and generator designs, and related procedures. Among others, rotary motors and generators find particular application in the performance of power conversion for vehicles (hybrid, all-electric, or otherwise) and alternative energy production (e.g., deriving electricity from wind, waves, tides, streams, rivers, or the like)—just to name a few examples.

The presence of electrically conductive coils is nearly ubiquitous to all electromagnetic rotary motor and generator designs. In one form, each coil extends away from a central rotational axis along a respective radius, turning thereabout to produce a magnetic field along a magnetic axis collinear with the respective radius and/or derive electricity from a magnetic field by induction. Each respective radius is perpendicular to the rotational axis and all radii originate at about the same point therealong. While radially-oriented coil designs enjoy widespread application, so do designs with axially-oriented coils that each turn about a respective magnetic axis oriented parallel to a centrally-located axis of rotation. In a further refinement, certain designs fulfill some magnetic field production requirements with one or more permanent magnets—being of either the radial or axial design type. Accordingly, there is demand for further contributions to such areas of technology.

As a preface to the remainder of the application, guidance follows about the explicit definition of selected terminology herein. Such definition may be suggested when: (a) a new term is needed (e.g. portmanteau, neologism, etc.) that may be comprised of one or more words, letters, numerals, punctuation symbols, or other written expression adequate to determine meaning as used herein; (b) a term, its scope, or its meaning is ambiguous, confusing, inconsistent, or subject to a definitional dispute from the field perspective (defined hereinafter); (c) exercising an inventor's lexicographic discretion; or (d) addressing any other inadequacy or incongruence regarding the subject term definition. It should be recognized that a definition can be assigned to a given term (e.g. a symbol, a word, a multi-word phrase, other expression, etc.) with a formalistic, direct statement (like a dictionary entry), or with one or more other less direct approaches in addition to or in lieu of such a statement. Among these approaches are: exemplification (positive or negative examples); explanation of at least one application/implementation of the term meaning; a technical/scientific expression (mathematical language/symbolism, field-specific notation, or the like); comparison potential meanings/terms to identify differences/similarities therebetween; existence/degree of mutual exclusivity with respect to different terms or potential meanings; ranking, ordering, listing, grouping, or other subordinate relational information concerning the subject term; or negation language (what the term "is not")—to name a few representative examples. Perhaps the most indirect approach attributes meaning to certain lexical terminology through operation of associated functional content (e.g. punctuation, function wording, etc.) that appear together in a recognizable pattern. As used herein, "definition" refers to the result of any of these techniques alone or in any combination. As set forth herein, a definition may stand on its own or belong to a list of different definitions either of which can be presented anywhere in the present application. When a subject term is initially defined, it is typically placed in double quotation marks (" ") or demarcated by a colon (:) and closely followed by a description to directly/indirectly ascribe meaning. Alternatively, terminology subject to definition may closely precede a parenthetical description that attributes meaning. Alternatively, a parenthetical can spell-out/expand an acronym or abbreviation that closely precedes it or can enclose such acronym or abbreviation with the expanded description in close proximity thereto. Within parentheses, single quotes (' ') are used instead of double quotes (" ") but otherwise have the same effect. In addition to these aforementioned applications, parentheses, single quotation marks, double quotation marks, and colons can be used to selectively demarcate or offset terminology in a manner that otherwise enhances understanding of the associated subject matter. The definition of a subject term shall uniformly apply to each occurrence thereof even if the form or formatting of such term varies with different occurrences. In some situations, quotation marks, parentheticals, colons, or the like may be used to attribute meaning to a subject term more than once—in which case the broadest reasonable meaning and scope of such term should be ascertained by cumulatively considering all definitional information together collectively. However, upon the introduction of information that is inconsistent with any prior attribution of meaning for a given term, the cumulative meaning without consideration of such information is favored. While most often set forth upon first occurrence of a subject term, the definition of a subject term is applicable to every occurrence throughout the present application—including any occurrence of such term in advance of the definition unless unambiguously directed otherwise in an accompanying statement herein. The definition of a subject term also applies even if such term is nested within the definition of a different term or language within the definition description depends on another definition set forth herein. It should be appreciated that an unambiguous written statement directed to the definition of a given term shall take precedence over any of the foregoing. However, such statement and all the other content of the present application shall be understood in a manner that is not repugnant to the usual meaning of the given term. The following list of definitions concludes this preface:

(1) "Field Perspective" means either one or both of: (a) the perspective of those with common knowledge or general knowledge, or (b) the perspective of those of ordinary skill in the art(s)/field(s) relevant to the subject matter of the present application.

(2) "Portion" broadly refers to a part, piece, or component that is separate from the whole and also to any part, piece, or component that is integral to, included in, and/or a constituent of the whole.

(3) "Or" as the penultimate term of a list with multiple entries (items) imparts an "inclusive disjunction" operation (also designated 'alternation') to the entries so that the list is applicable (i.e. it returns a positive result) as long as at least one of the entries exists, happens, or is performed—and is also applicable with the coexistence, happening, or performance of any combination of the entries (including a combination of all entries). However, to the extent there is an unambiguous indication contrary to inclusive disjunction operation, a different operation can result. Such indication can arise from: lexical content of one or more list entries (e.g. two or more entries are mutually exclusive); modification of the inclusive disjunction operation by a different part of the sentence that includes the list (e.g. "no more than one of . . . " that closely precedes the list); or other application language asserting the alteration or replacement of inclusive disjunction operation with respect to the list. In comparison, "exclusive disjunction" operation of the conjunction "or" as the penultimate term of a multi-entry list is more restricted because the list is only applicable if only one entry exists, happens, or is performed (so the coexistence, happening, or performance of multiple entries renders the list inapplicable). "It is night, day, noon, or midnight . . . " provides a further example in which inclusive disjunction operation is changed to the extent there is only a partial degree of mutually exclusivity. Specifically, in this sentence night/day and noon/midnight are mutually exclusive, while night/midnight and day/noon are not mutually exclusive. The resulting possibilities are: (1) night, (2) both night and midnight, (3) day, (4) both day and noon. This example favors a "hybrid" form of operation that excises mutual exclusivity to the extent present while preserving the results of disjunction operation otherwise. However, if the inclusive disjunction operation of "or" cannot be reasonably preserved to a meaningful extent, the alternative is exclusive disjunction operation.

(4) "And" as the penultimate term of a multi-entry list presumptively imparts conjunctive operation so the list only applies upon coexistence, happening, or performance of all the entries. However, accompanying language can replace this operation with another such as inclusive disjunction. For instance, given a list of "A, B, and C . . . ," certain preceding language indicates inclusive disjunction operation is more favorable, as in "one or more of A, B and C . . . ," "at least one of A, B, and C," and the like.

(5) "Permanent magnetic material" means one or more of: (a) a substance including iron (Fe); (b) a substance including Nickel (Ni); (c) a substance including Cobalt (Co); (d) loadstone, magnetite, Titanium/Iron (Ti/Fe) oxides like titanomagnetites ($Fe_{3-x}Ti_xO_4$ for x between 0 and 1), or other substance found in nature with natural magnetism; (e) any ferromagnetic substance; (f) any ferrimagnetic substance; (g) any substance exhibiting magnetism that persists at a sufficient magnitude for an acceptable duration while under temperature and pressure conditions suitable for its intended purpose (to the extent applicable)—where such magnetism persists even when the subject substance is separated from an external magnetic field source that initially magnetizes the same (if any); or (h) any combination of two or more of the substances described under (5)(a)-(5)(g) hereinbefore. To dispel any doubt, a permanent magnetic material does not include a substance that is diamagnetic or paramagnetic under conditions suitable for its intended use (such as temperature or pressure). A permanent magnetic material can take any of a number of forms, such as a metallic alloy including Fe, Co, or Ni; iron oxides or sulfides, ceramics, a different compound type, or the like; provided that it includes at least one of the substances described under (5)(a)-(5)(h) set forth hereinbefore. Some common/desired permanent magnetic materials include ferrite, ALNICO (any of several different Aluminum-Nickel-Cobalt alloys), rare earth element alloys (e.g. Samarium-Cobalt (Sm—Co) combinations like $SmCo_5$ or $Sm(Co, Fe, Cu, Zr)_7$ and Neodymium-Iron (Nd—Fe) combinations like $Nd_5Fe_{14}B$), Yttrium-Iron-Garnet (YIG) combinations, other alloys/compounds comprised of Fe or Co, and the like. Whether a permanent magnetic material is present depends on composition of the subject device—recognizing that the flow of electric charge along a predefined pathway of a device (e.g. an electrical coil, electromagnet, winding, solenoid, superconductor, or the like) can provide a persistent magnetic field although no permanent magnetic material is present. Even so, other devices provide a persistent magnetic field by directing a controlled electric charge flow through a winding and also with a permanent magnetic material in one or more constituents thereof, such as a ferromagnetic or ferrimagnetic core of the winding that exhibits persistent magnetism even when electric charge is not flowing through such winding.

(6) "Magnetically Active Device" means any source of a magnetic field, including without limitation: (a) a permanent magnet (e.g., a magnetized element of ferromagnetic and/or ferrimagnetic composition) from which the magnetic field persists long-term despite the absence of an externally applied magnetic field; (b) an electromagnet responsive to an electric charge flow to change strength of the magnetic field generated thereby, or (c) an inductor with an electric charge flow pathway (whether such electric charge flow is static or time-varying) shaped with one or more turns aligned to generate the magnetic field when the electric charge flows along the pathway (e.g., including without limitation: an electrically conductive winding about an iron core, a paramagnetic core, a diamagnetic core, or air core; a transformer; a solenoid, or the like—just to name a few). Inclusive disjunction operation applies to any of the information under (6)(a)-(6)(c), i.e. two or more of these meanings may apply to a given magnetically active device, may overlap in scope, or otherwise be redundant. For avoidance of doubt, this definition does not encompass a straight or curved electrically conductive wire with less than one complete turn. It should be appreciated that any two magnetically active devices may be positioned relative to one another to either magnetically repel (same poles closer to each other than opposing poles) or magnetically attract (opposing poles closer to each other than the same poles)

(7) "Magnetic Axis" means an axis that is dependent on the "m" number of poles integrated in the subject device. For a two-pole (m=2) ideal "dipole" model (or differs from the ideal only negligibly), this axis is a straight line that intersects the opposing poles in the "center" of each as depends on the geometry of the device material. This model is frequently used to define the magnetic axis of the Earth's magnetic field. Further, under this model the magnetic axis is coincident with the longitudinal centerline of an ideal elongate bar magnet. It should be appreciated that the magnetic axis is used herein to provide a reference/base for describing various magnetic field characteristics, as appropriate. Likewise, the magnetic axis for a multi-turn winding corresponds to its centerline longitude through its core (air, ferrous, or otherwise). For comparison purposes, if m>2, for 2m poles (such as a quadrupole, sextupole, and higher even-number pole types), the axis is the locus of points along which the 2(m−1) terms are zero (0).

(8) "Bifilar" means two approximately parallel elongate electrical conductors held in a spaced apart relationship and electrically insulated from each other. Without limitation, these electrical conductors may each be a twisted or untwisted single unitary filament, a multi-stranded arrangement, a braid, a thread, cabling, wire with any type of cross-section, or the like—just to name a few. By way of further nonlimiting example, the distance separating the two conductors is equal to or less than two times the maximum width of the conductor taken transverse to its longitude. In one twisted form, individual metal filaments turn about one another and each has a helical structure complimentary to the other.

SUMMARY

Among the embodiments of the present application are unique electromagnetic machinery devices, apparatus, circuitry, assemblies, mechanisms, systems, methods, practices, processes, procedures, and/or combinations. Other embodiments include unique techniques to generate electrical energy and/or mechanical power with a permanent magnet and coil moving in relation to one another.

A further embodiment includes: during rotation of a first rotor including one or more permanent magnets, repelling the magnets with an electromagnetic bifilar coil, the bifilar coil including a first winding and a second winding connected together in a spaced-apart relationship and electrically insulated from one another to be approximately parallel to one another; timing a first time-varying electrical current through a first electrical circuit to electromagnetically power the rotation, the first electrical circuit including a magnetically responsive device, an electrical power source, and the first winding to electromagnetically power the rotation of the rotor; and inductively generating a second time-varying electrical current flow through a second electrical circuit, the second circuit including the second winding and an electrical load, the electrical load being powered by the second time-varying electrical current flow.

Another embodiment directed to a system, comprises: a first rotor structured to rotate about a first rotational axis, the first rotor defining a first outer periphery and including a number of first permanent magnets each with a like north-south magnetic polarity extending along a different radial axis relative to the first rotational axis, the first magnets each having a first pole opposite a second pole, the second pole being closer to the first rotational axis than the first pole for each respective one of the first magnets; a second rotor structured to rotate about a second rotational axis and including a number of second permanent magnets, the second magnets each having the first pole opposite the second pole, the first pole of being closer to the second rotational axis than the first pole for each respective one of the second magnets, the first rotational axis being approximately parallel relative to the second rotational axis; and an electromagnetic coil positioned between the first rotor and the second rotor and spaced apart therefrom, the coil including a first end and a second end, the first end being closer to the first periphery than the second end and the second end being closer to the second periphery than the first end.

Still another embodiment includes: a first rotor structured to rotate about a first rotational axis, the first rotor defining a first outer periphery and including a number of first permanent magnets each radially extending from the first axis to the outer periphery with a first pole closer to the first axis than the first outer periphery; a second rotor structured to rotate about a second rotational axis, the second rotor defining a second outer periphery and including a number of second permanent magnets each radially extending from the second axis with a second pole closer to the second axis than the second outer periphery, the second pole being an opposite magnetic pole relative to first pole; and an electromagnetic coil extending between the first rotor and the second rotor and spaced apart therefrom, the coil including a first end closer to the first periphery than a second end and the second end being closer to the second periphery than the first end.

Yet another embodiment comprises: operating electromechanical machinery including an electromagnetic coil positioned between a first rotor and a second rotor and spaced apart therefrom, the coil including opposing end portions each closest to a different one of the first rotor and the second rotor, the first rotor including two or more first permanent magnets each with a first magnetic pole outwardly facing away from the first rotor, the second rotor including two or more second permanent magnets each with a second magnetic pole outwardly facing away from the second rotor, the first pole and the second pole being of opposite magnetic polarity; supplying an electric current through the coil to generate a corresponding coil magnetic field with like polarity to the first pole at a first one of the end portions and like polarity to the second pole at a second one of the end portions; and repelling the first rotor and the second rotor away from the coil to generate rotation of the first rotor and the second rotor.

A further embodiment is comprised of: control circuitry including means for detecting a magnetic field and means for supplying electrical power; an electromagnetic coil electrically coupled to the detecting means and the supplying means; two rotors each including a number of permanent magnets; and means for simultaneously rotating the rotors by magnetic repulsion in response to controlled flow of electric current through the electromagnetic coil with the control circuitry.

Yet a further embodiment comprises: operating electromechanical machinery including a first rotor and a stator, the stator including a first electromagnetic coil spaced apart from the first rotor, the first rotor including a number of first permanent magnets fixed in relation thereto, the first magnets each including a first magnetic pole opposite a second magnetic pole; during the operating of the electromechanical machinery, rotating the first rotor about a first rotational axis; for each one of the first magnets, the first pole of the first magnets successively passing closer to the first coil than the first pole of any other of the first magnets, the second pole of each respective one of the first magnets be positioned farther away from the coil than the first pole of the respective one of the first magnets during the rotating of the first rotor; and providing a train of electrical current pulses through the first coil timed and polarized to magnetically repel the first pole of the first magnets during the first pole passing closer to the first coil than the first pole of any other of the first magnets.

The above introduction is not to be considered exhaustive or exclusive in nature—merely serving as a forward to further advantages, alloys, apparatus, applications, arrangements, aspects, assemblies, attributes, benefits, characterizations, circuitry, circuits, combinations, components, compositions, compounds, conditions, configurations, constituents, crystallizations, designs, details, detectors, determinations, devices, discoveries, electronics, elements, embodiments, examples, experiments, explanations, expressions, factors, features, forms, formulae, gains, implementations, innovations, kits, layouts, machinery, manufactures, materials, mechanisms, methods, modes, models, objects, options, operations, parts, practices, procedures, processes, properties, qualities, refinements, relationships, representations, sensors, species, structures, substitutions, synthesis, systems, techniques, traits, uses, utilities, variables, and/or variations that shall become apparent from the description provided herewith, from any claimed invention, drawing, and/or other information included herein.

BRIEF DESCRIPTION OF THE DRAWING(S)

As set forth herein, like reference numerals in one figure refer to like features previously described in another figure already introduced and previously described: described.

Figure 4:
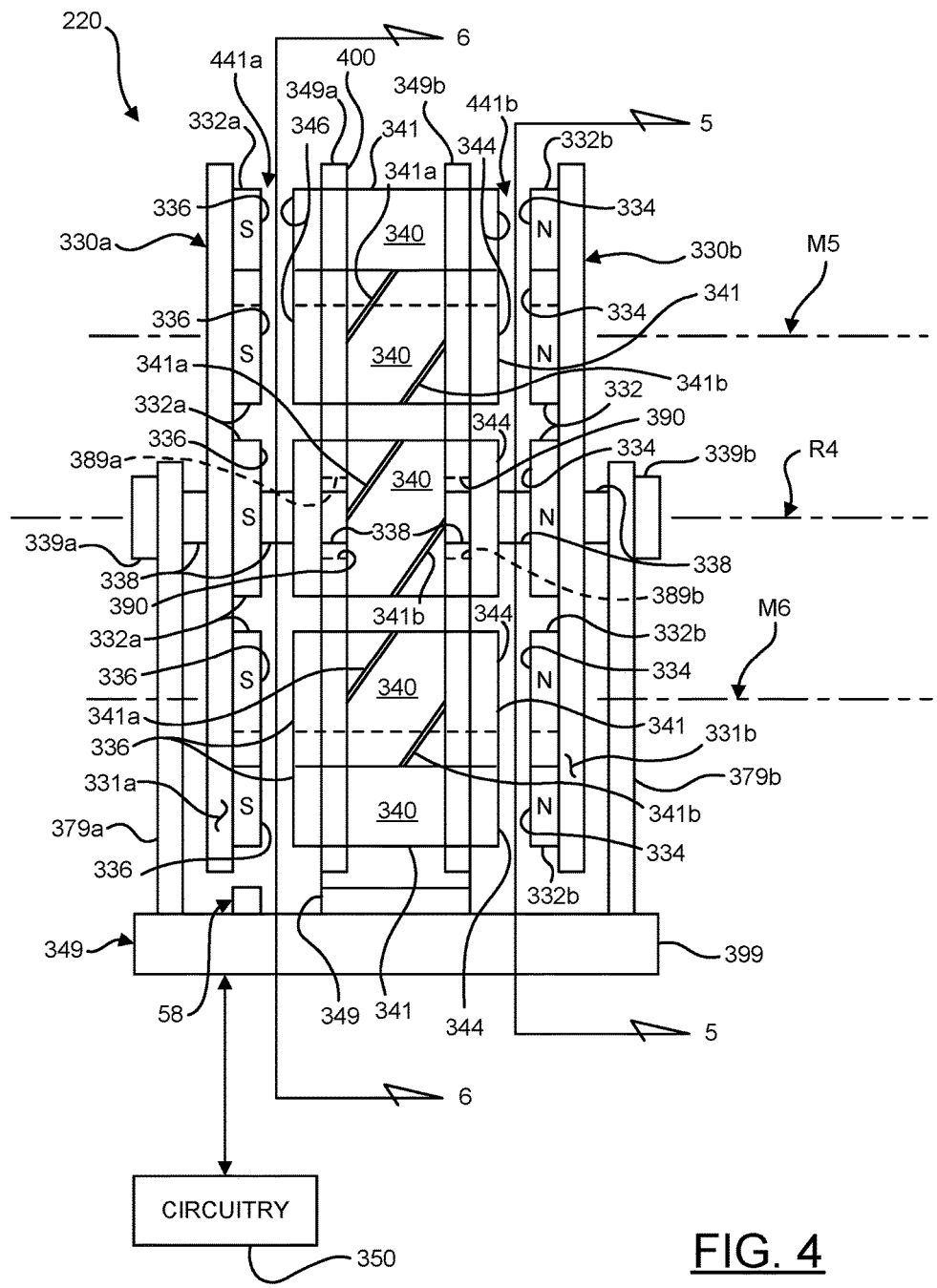
FIG. 4 is a partially schematic, side view of still another electromagnetic machinery system including two permanent magnet rotors with a common rotational axis (coaxial), multiple electromagnetic coils positioned between the rotors about the rotational axis, and associated circuitry.
Figure 5:
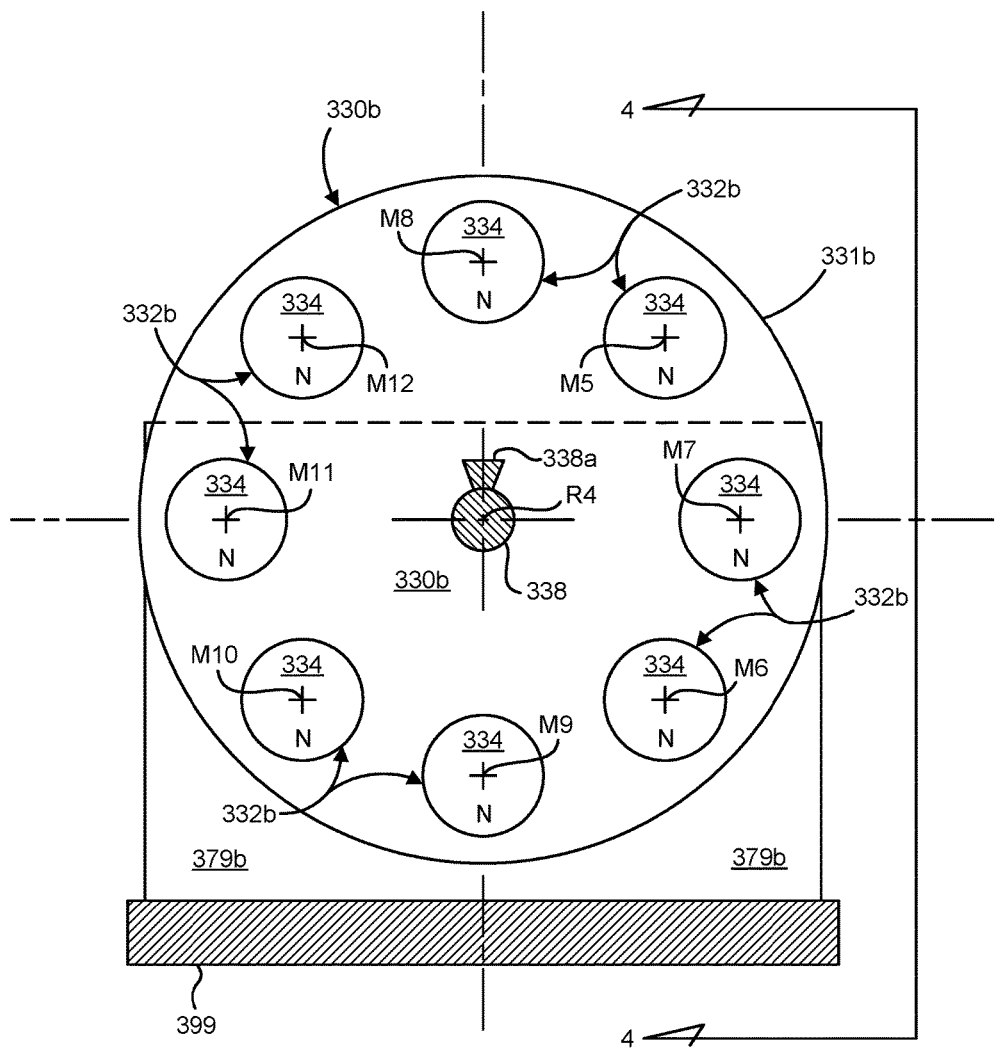

FIG. 5 is a partially diagrammatic, cross-sectional view of the left side of one of the two rotors shown farthest to the right in the electromagnetic machinery system depicted in FIG. 4. This view of the rotor shows eight permanent magnets. In FIG. 5, the 4-4 section line illustrates that the FIG. 4 view plane is perpendicular to the view plane of FIG. 5 and parallel to the view plane of FIG. 6. FIG. 5 omits certain features to preserve clarity—such as the circuitry shown in FIG. 4.

Figure 6:
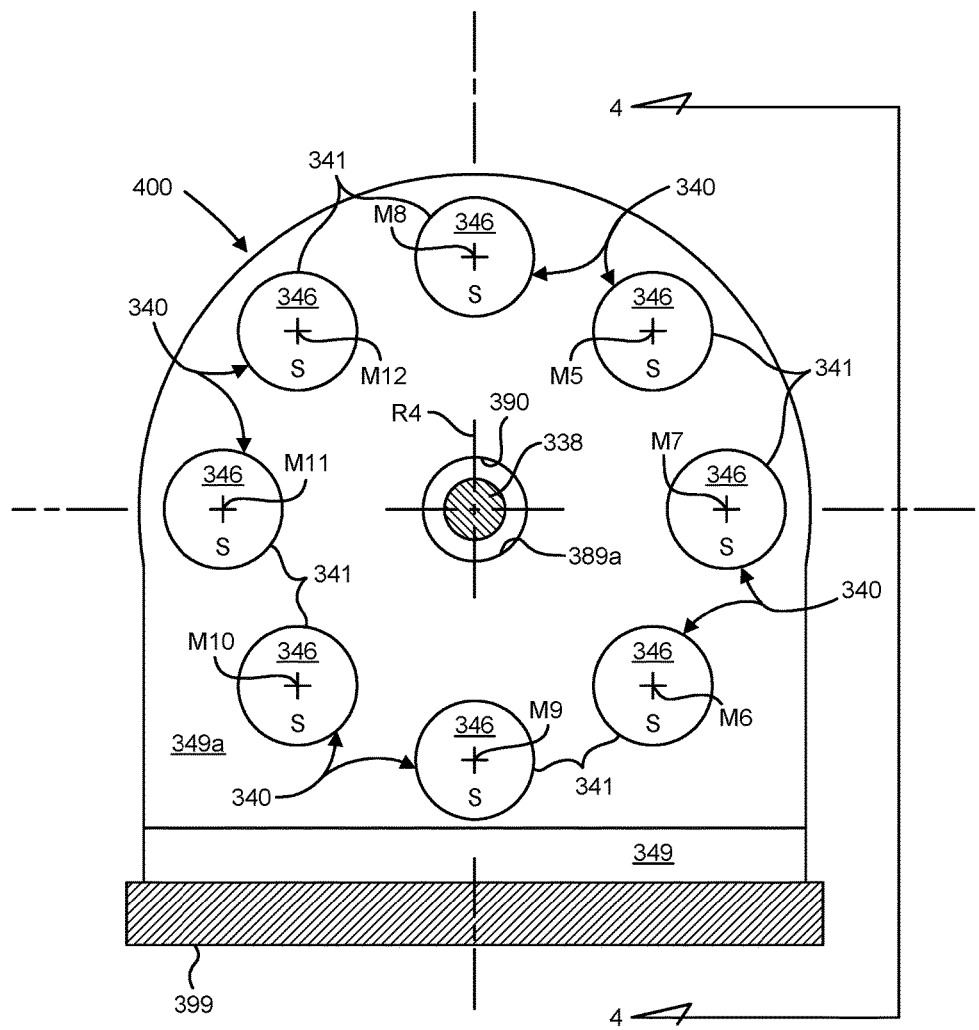

FIG. 6 is a partially diagrammatic, cross-sectional view of the left side of the stator shown in the electromagnetic machinery system depicted in FIG. 4. This view of the stator shows eight coils. In FIG. 6, the 4-4 section line illustrates that the FIG. 4 view plane is perpendicular to the view plane of FIG. 6 and parallel to the view plane of FIG. 5. FIG. 6 omits certain features to preserve clarity—such as the circuitry shown in FIG. 4.

DETAILED DESCRIPTION OF REPRESENTATIVE EMBODIMENTS

In the following description, various details are set forth to provide a thorough understanding of the principles and subject matter of each invention described and/or claimed herein. To promote this understanding, the description refers to representative embodiments—using specific language to communicate the same accompanied by any drawing(s) to the extent the description subject matter admits to illustration. In other instances, when the description subject matter is well-known, such subject matter may not be described in detail and/or may not be illustrated by any drawing(s) to avoid obscuring information to be conveyed hereby.

Considering the invention(s) defined by the description and/or the claim(s) further, those skilled in the relevant art will recognize that such invention(s) can be practiced without one or more specific details included in the description. It is also recognized by those skilled in the relevant art that the full scope of an invention described and/or claimed herein can encompass more detail than that made explicit herein. Such unexpressed detail can be directed to apparatus, applications, arrangements, combinations, components, compositions, compounds, conditions, configurations, constituents, designs, devices, elements, embodiments, features, forms, formulae, implementations, kits, modifications, materials, mechanisms, methods, modes, operations, parts, processes, properties, qualities, refinements, relationships, structures, systems, techniques, and/or uses—just to name a few. Accordingly, this description of representative embodiments should be seen as illustrative only and not limiting the scope of any invention described and/or claimed herein.

Figure 1:
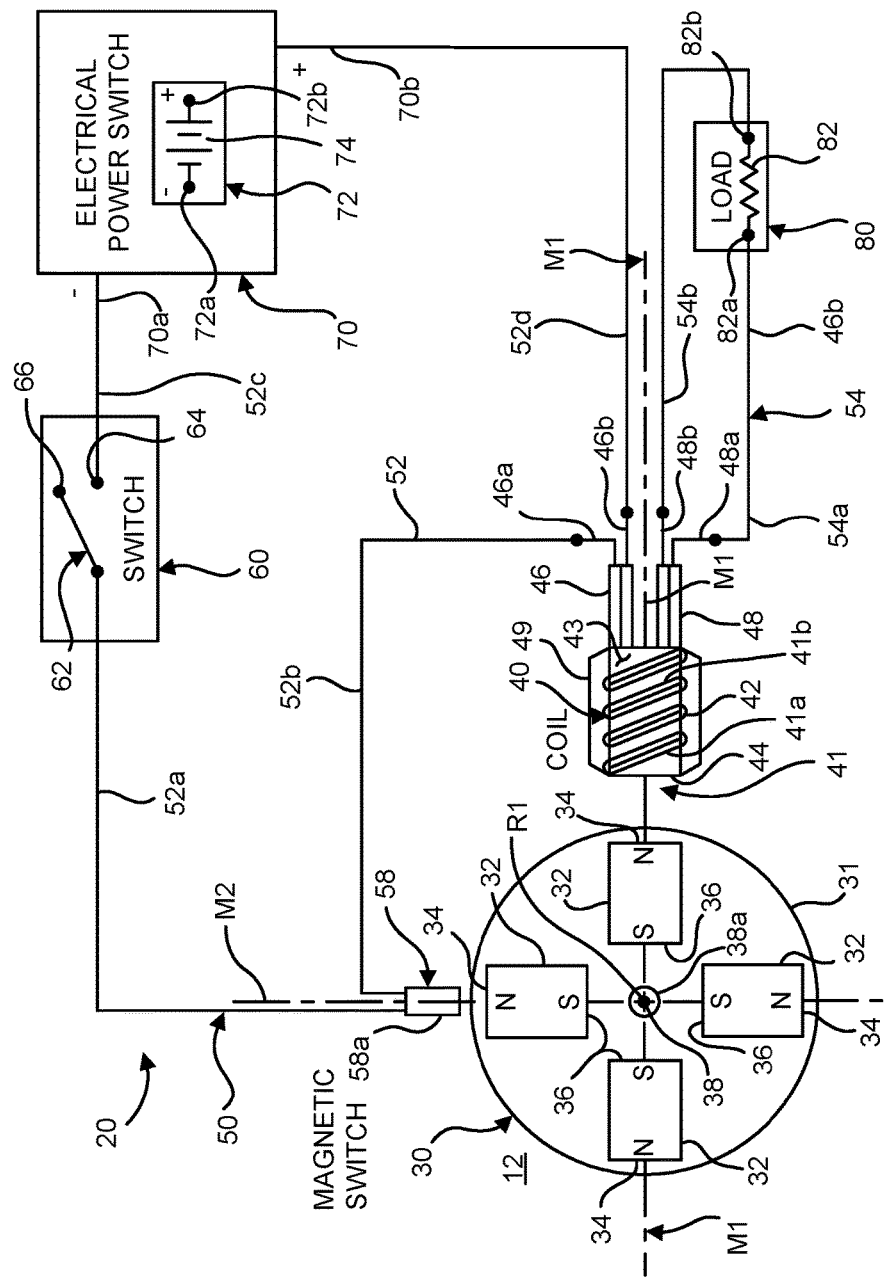
FIG. 1 is a partially schematic, top view of an electromagnetic machinery system of the present application including a permanent magnet rotor, a bifilar electromagnetic coil, and associated electrical circuitry.

FIG. 1 depicts electromagnetic machinery system 20 of one illustrated embodiment of the present application. System 20 includes permanent magnet rotor 30 with outer peripheral margin 31. Rotor 30 is rotatable relative to stator base 12 in the form of an enclosure, substrate, mounting, or the like. Central shaft 38 and rotary bearing 38a are rotationally coupled together to provide rotatable mounting of rotor 30 to stator base 12—i.e. rotor 30 may freely rotate about rotational axis R1 with an acceptable degree of friction, heat generation, and the like. Rotational axis R1 is depicted with crosshairs because it is perpendicular to the view plane of FIG. 1. Rotor 30 includes four permanent magnets 32 with the north and south poles designated by uppercase letters N and S, respectively. Magnets 32 are each comprised of one or more permanent magnetic materials (previously defined). In contrast, rotor 30 is generally comprised of a material that is not ferromagnetic or otherwise non-negligibly attracted or repelled by a magnetic field in the depicted embodiment. In some typical embodiments, the rotor is comprised of one or more substances of a diamagnetic type. For each magnet 32, its north pole N is closer to the outmost peripheral margin 31 of rotor 30 than its south pole S. Accordingly, each magnet 32 includes outer pole face 34 (each with N-type magnetic polarity) opposite inner pole face 36 (each with S-type magnetic polarity). Magnets 32 are elongate in the depicted embodiment—being sized and shaped approximately the same as the others. In one form, magnets 32 are each in the shape of a right circular cylinder. In a further form, magnets 32 are each of a generally parallelepiped shape or a rectangular cuboid type, a rhombohedron, or the like. In yet other embodiments, one or more of the magnets 32 may differ from at least one other of the magnets 32 in terms of size, composition, spatial orientation, shape, quantity, or the like. In certain embodiments, each magnet 32 is mechanically fixed to rotor 30 by press-fit connection, at least one fastener, an adhesive bond, or such other coupling/joining as would be known to those of ordinary skill in the art. It should be appreciated that the longitude of each of magnets 32 extends along a different radius approximately originating with axis R1 (a "center") and being generally orthogonal thereto. The corresponding four different radii are at approximately ninety (90) degree intervals. Correspondingly, magnets 32 are each positioned along a radius approximately ninety degrees (90°) from one to the next using axis R1 as the radial origin.

Magnets 32 are spatially oriented relative to each other to be approximately equidistant from axis R1 and margin 31, but in other embodiments hereof, one or more of magnets 32 can be positioned such that pole face 34 is generally flush with margin 31 or extends past margin 31, or pole face 36 can extend up to or past the rotational center of axis R1. Alternatively or additionally, magnets 32 can otherwise have a different spatial orientation with respect to axis R1, margin 31, rotor 30, or each other. Considering magnets 32 each individually in isolation, magnet 32 the magnetism can be modelled by closed loop magnetic field lines typical of an elongate bar magnet with north N and south S poles at opposite ends of its longitudinal centerline; where the flux density is generally greatest as it passes through the magnetic material and has a substantial component that is coincident to such longitudinal centerline. Further, the flux (magnetic field line) pattern is generally symmetric about this centerline as well as in other aspects. In contrast, considering magnets 32 collectively there is the potential for a non-negligible degree of asymmetry as to the magnetic field lines for each magnet 32 because all of the pole faces 36 (each of south S polarity) are closer to one another than pole faces 34 (each of the north N polarity). The negligibility of this degree of asymmetry depends on various circumstances such relative to magnetic field strength versus pole face 36 spacing, etc. In other words, the central region of rotor 30 have the potential to present a significant magnetic repulsion pattern of the magnetic field lines due to this same pole (south S) closeness. Nonetheless, the magnetic field arrangement of the group of four (4) magnets 32 collectively can be generally symmetric relative to rotational axis R1, and the fixed connection to rotor 30 keeps magnets 32 restrained despite the repulsion—such that magnets 32 are carried with rotor 30.

FIG. 1 symbolically depicts magnetic axis M1 through each of the horizontally-extending pair of magnets 32 and magnetic axis M2 through each of the vertically-extending pair of magnets 32 (where 'magnetic axis' is defined hereinbefore and is based on an idealized dipole model of each magnet 32). As magnetic axes M1 and M2 each extend along the length of a given one of magnets 32, the corresponding longitudinal centerline of such magnet 32 is generally coincident thereto. Magnetic axes M1 and M2 are perpendicular to one another and rotational axis R1. In certain embodiments, the magnetic field flux density is greatest through the permanent magnetic material of each of magnets 32 relative to a cross-sectional area through the material oriented with the longitudinal centerline being normal to such area (where this centerline corresponds to axes M1 and M2 in FIG. 1). In one form of this embodiment, there are no active magnetic devices (previously defined) carried with rotor 30 other than the four (4) permanent magnets 32 illustrated. Accordingly, for this form, a dipole model/idealization is applied to each magnet 32 for the purposes of representing magnetic axes M1 and M2 with line segments comprised of two alternating dashes of different lengths. As depicted for system 20, there are no other permanent or electromagnets positioned between the illustrated magnets 32, i.e. no quadrupole, sextupole, or higher order "m" multi-pole magnetic field arrangement, a Halbach array or similar exotic magnetic field generator, or the like as might be used for certain motor/generator applications, polarized beam acceleration/steering, ion trapping, or the like. Even so, in other forms, such an alternative arrangement may be present.

System 20 further includes a magnetically active device (defined hereinbefore) in the form of an electromagnetic coil device 40. Device 40 is fixed to stator base 12 by stator support 49 thereof, remaining stationary relative to the rotation of rotor 30. Stator support 49 may be an assembled or integral constituent of stator base 12; where each has generally the same composition. Such composition may include any substance, composite material, or combination of various substances suitable for the intended application, implementation, use, operation, etc. of system 20. For certain embodiments, some or all of either stator base 12, stator support 49, or both is diamagnetic or paramagnetic without any permanent magnetic material substance included that can be non-negligibly magnetized by any other constituent of system 20.

Device 40 is separated from margin 31 of rotor 30 by air gap 41. Device 40 includes two electrically conductive windings 41a and 41b provided by multiple turns of bifilar coil 42 about core 43. Core 43 may be iron, ferrite, another permanent magnetic material, air (absent), a paramagnetic material, a diamagnetic material, a combination of two or more of the forgoing, or such other composition as would be known to those of ordinary skill in the art—to name a few representative examples. Bifilar coil 42 comprises two side-by-side electrical conductors held apart from each other in a spaced apart relationship—such that the conductor pair are approximately parallel to one another. Closest to rotor 30 is coil face 44. Opposite face 44 are bifilar power circuit terminal portion 46 with two power circuit conductor interfaces 46a and 46b, and bifilar load circuit terminal portion 48 with two load circuit conductor interfaces 48a and 48b. The longitudinal centerline through device 40 is coincident with magnetic axis M1. It should be appreciated that if an electrical current flows through winding 41a, winding 41a has a sufficient number of turns about core 43 to generate a magnetic field with opposing magnetic poles at opposite ends of device 40 along magnetic axis M1 of sufficient strength to provide for the controlled rotation of rotor 30 in a motor mode of operation—as will be further explained hereinafter.

However, circuitry 50 of system 20 is further described first. Circuitry 50 is electrically connected to device 40 via conductors 46a and 46b, and via conductors 48a and 48b. Circuitry 50 includes power control loop 52 and load power loop 54. Conductors 46a and 46b electrically couple winding 41a of device 40 in power control loop 52, and conductors 48a and 48b electrically couple winding 41b of device 40 in load power loop 54 to circuitry 50 and conductors 48a and 48b electrically couple the other of windings 41a and 41b to circuitry 50. Circuitry 50 is considered hereinafter under a lump element electrical network model that is premised on ideal performance of the circuit elements with negligible or practically no higher order effects (secondary, tertiary, etc.). Applying this model, circuitry 50 includes a number of branches (to be described hereinafter in terms of loops 52 and 54) and a number of electrical nodes 52a, 52b, 52c, 52d, 54a, and 54b each interconnecting at least two branches. In one form of this model, interconnecting electrical nodes 52a-52d, 54a, and 54b are each made of a metallic wire core material (e.g. copper, aluminum, alloys thereof, or the like), that is covered by electrical insulation except at opposing ends where the conductive material may be modestly exposed to make electrical contact between corresponding branches. This material has high electrical conductivity, with negligible or practically no electrical resistivity, reactance, or the like for the purposes of this lump element modeling.

Power control loop 52 further includes magnetic field detector 58, which is more specifically designated as magnetic switch 58a responsive to a magnetic field in close proximity thereto (such as that from the closest magnet 32 aligned with detector 58 along magnetic axis M2). Detector 58 is "contactless" in the sense it operates in response to magnetism without touching or "contacting" rotor 30. In one form, switch 58a includes an internal actuator (not shown) of a magnetically attractable (paramagnetic) composition with a spring-bias sufficient to position it in a "normally open" state to correspondingly prevent electric current flow through detector 58 and loop 52, unless this mechanical spring-bias is overcome by magnetic attraction from the magnetic field of magnet 32 while in such sufficiently close proximity to switch detector 58 to a closed state and correspondingly permit electrical current flow through loop 52. The magnetic field from magnet 32 closest to detector 58 is of appropriate magnitude to cause the actuator to switch from the open state to the closed state until rotation of rotor 30 moves this magnet 32 far enough away from detector 58 for spring-biasing to again take effect (changing switch 58a from back to the open state from the closed state—resulting in loop 52 becoming an open circuit. In other embodiments, detector 58 may be provided in a different form, such as a Hall Effect device, magnetically actuated relay, and/or such other arrangement as would be known to those of ordinary skill in the art. Such alternatives may include support circuitry, as appropriate, to facilitate suitable operation (not shown). It should be appreciated that switch 58a is closed when detector 58 is positioned along magnetic axis M2 approximately ninety degrees (90°) away from the longitude and corresponding magnetic axis device 40.

Power control loop 52 further includes single-pole, single-throw power switch 60 with electrical contact 66 electrically coupled to one side of detector 58 by electrical node 52a. Electrical node 52b electrically couples conductor 46a of winding 41a to the other side of detector 58. Power switch 60 further includes electrical contact 64 electrically coupled to electric power source device 70 by electrical node 52c. Device 70 includes a Direct Current (D.C.) electric power source 72 in the form of an electrochemical cell battery 74. Battery 74 has negative terminal 72a electrically interconnected to node 52c and positive terminal 72b electrically interconnected to node 52d of loop 52. Electrical node 52d electrically couples conductor 46b and terminal 72b together. External device terminals 70a and 70b correspond to the negative and positive terminals 72a and 72b internal to device 70. Power switch 60 permits a user/operator of system 20 to electrically activate and deactivate power control loop 52 of circuitry 50 by switching between the electrically closed state and the electrically open state. In other forms (not shown), switch 60 may be of a different type or may be absent. It should be appreciated that winding 41a, detector 58 (magnetic switch 58a), power switch 60, and electric power source 72 provide various electrical branches of loop 52 in correspondence to the interconnecting nodes 52a-52d. Load power loop 54 includes electrical node 54a electrically coupling conductor 48a of winding 41b to electrical contact 82a of electrical load 80. As depicted, load 80 is a two-terminal device 82 with electrical contact 82b electrically coupled to conductor 48b by electrical node 54b. It should be appreciated that winding 41b and load 80 provide electrical branches of loop 54, as interconnected by electrical nodes 54a and 54b, respectively. Winding 41b includes multiple turns about core 43 of a quantity suitable to inductively generate a current through loop 54 as rotor 30 turns—all of which are next explained in greater detail.

Turning to certain selected operational aspects of system 20, in some instances the description refer to various embodiments that differ operationally, compositionally, and/or structurally. In correspondence, such differences may be explained, in part or in whole, by referral to certain operating hypotheses, theories, modeling, expected steady state and transient state modalities, empirical observations, and the like—especially in relation to circuitry 50. With the topmost magnet 32 aligned with detector 58 per the FIG. 1 depiction, the magnetic field thereby overcomes the spring-bias of the normally open position to close switch 58a—electrically bridging nodes 52a and 52b. With power switch 60 in the open state, electric current still does not flow through loop 52. However, once power switch 60 is closed, electrical current flows through loop 52, and DC power source 72 correspondingly energizes winding 41a. Once energized, winding 41a generates a magnetic field—being a form of magnetically active device. The rotational direction of the turns of winding 41a relative to the electrical polarity of power source 72 results in a north-type of polarity (N) of the magnetic field emanating from face 44. Because the closest permanent magnet 32 to device 40 also presents a north pole (N), this magnet 32 and winding 41a of device 40 repel each other in the vicinity of the air gap 41 between rotor 30 and winding 41a. This repulsion results in an electromotive force sufficient to urge rotation of rotor 30. Unless otherwise expressly indicated, power switch 60 remains closed during the proceeding explanation of system 20 operation—such that it does not prevent electrical current flow through loop 52 when detector 58/switch 58a is electrically closed. It should be appreciated that the state of switch 60 can be changed between closed and open to turn-on and turn-off system 20, respectively. In one form, power switch 60 is of a hand-adjusted manual toggle type; however, in other forms power switch 60 may be differently configured (such as another manual type, an electronically controlled relay, etc.), or power switch 60 may be absent.

As rotor 30 rotates and electrical current flows through loop 52, the topmost magnet 32 and its corresponding magnetic field move away from detector 58. This displacement of the magnetic field generated by the permanent magnet 32 away from detector 58 eventually results in a change of state from closed to open, as the spring-bias overcomes the progressively weakening magnetic field. In response, power control circuit loop 52 becomes electrically open and electrical current flow from source 72 ceases. It should be understood that when power control circuit loop 52 was closed, source 72 may have supplied an appreciable amount of energy that is stored in the magnetic field or winding 41a of device 40. While winding 41a eventually de-energizes as this magnetic field collapses, transient circuit behavior during magnetic field energy dissipation should be considered while power control loop 52 first changes from a closed state to electrically open state. For instance, in certain embodiments, as the magnetic field of winding 41a collapses, it does so with sufficient energy to cause a transient voltage spike or "inductive kick" of unacceptable magnitude. Under widely-accepted induction theory, this voltage can result (at least in part) because the collapsing magnetic field of winding 41 passes through or "cuts across" the corresponding conductors of bifilar coil 42. Indeed, magnetic field flux passing through an electrically conductive material "induces" a voltage across such material of opposite polarity relative to its previous "steady state" operation when loop 52 was closed. In some of these embodiments, the transient voltage is sufficient to damage or shorten the life of various elements/components comprising the branches of circuitry 50. As a result, other embodiments reduce "inductive-kick" by placement of a unidirectional electric current flow device across winding 41a (not shown), typically in the form of a diode (a kind of unidirectional electrical current flow device) with suitable power rating, or a transistor configured to operate the same (like electrically coupling together: base and collector of a Bipolar Junction Transistor (BJT), source and drain of a Junction Field Effect Transistor (JFET), or gate and drain of a Metal Oxide Field Effect Transistor (MOSFET)). This diode application goes by several names, such as a flyback diode, a snubber diode, a freewheeling diode, a suppressor diode, a clamp diode, and a catch diode—just to list a few. In still other embodiments, inductive-kick may be negligible or practically absent so that no additional circuitry is needed to protect circuit components.

As rotor 30 continues to turn, the next magnet 32 aligns with detector 58 so that its magnetic field changes state of switch 58a from open to closed. In response, power control loop 52 is reactivated, energizing bifilar coil 42. Concomitantly, the next magnet 32 in order of rotation aligns with bifilar coil 42. As a result, the energized winding 41a generates a magnetic field with a polarity that repels this new aligned magnet 32, continuing the rotation of rotor 30. Consequently, power control loop 52 opens between magnet 32 alignments with any attendant inductive-kick transient followed by alignment of two other magnets 32 radially positioned about 90 degrees apart. This circuit behavior continues as long as power control switch 60 remains closed. It should be appreciated that a time-varying electrical current correspondingly flows through power control loop 52 as rotor 30 turns—causing device 70 to intermittently power the circuit with a period dependent on rotational speed of rotor 30. In certain embodiments, the resulting waveform of electrical current/voltage can vary to some extent with the rotational speed of rotor 40 relative to charge/discharge timing constant of winding 41a, the node/branch where detected, and the like. It should be appreciated that in further embodiments, loop 52 may be subject to a controller with operating logic in the form of hardware, software, firmware, and/or programming—to name a few examples. Such a controller may be used in conjunction with switch 60 or in place of it with controller interfacing through an electrically controlled relay, transistor switch, etc. Likewise, the controller may exert other regulation relative to the output of source 70—like changing the magnitude, time variability, and other characteristics of source 70 (without limitation, structuring source 70 to be a controlled current source operable within a certain voltage limits, rather than a voltage source).

Having considered selected aspects of power control loop 52, operation of load control loop 54 is next further considered. Load control loop 54 includes winding 41b of bifilar coil 42 and load 80. Load 80 may be of any type and present a generally constant or time varying electrical resistance and/or reactance. Furthermore, load 80 may be electrically passive or active in nature. In form, load 80 includes a Light Emitting Diode (LED). Winding 41b is coaxial with winding 41a relative to magnetic axis M1—being the other conductor of bifilar coil 42. In the depicted embodiment, both windings 41a and 41b follow approximately the same path approximately parallel to each other; generally each have the same electrical conductor size, shape, and composition; and have about the same number of turns about core 43. However, in other embodiments (not shown) windings 41a and 41b may vary from one another in terms of the number of turns; conductor size, shape, or composition; spatial relationship to each other; etc.—just to name a few possibilities. Because of the spatial orientation of winding 41b relative to winding 41a and the passing magnets 32 during rotor 30 rotation, voltage is induced in winding 41b. The resulting electrical power from winding 41b is provided to load 80. Accounting for higher order magnetic field effects, the induced electricity in winding 41b may be a complex time-varying waveform in terms of electrical current/voltage that is approximately periodic in correspondence with every ninety degrees (90°) of rotor 30 rotation.

It should be understood that the rotation of rotor 30 is powered with source 72 and winding 41a to operate as a motor 22. Accordingly, mechanical rotary power or torque is generated with shaft 38 as it turns together with rotor 30. In addition to this electromechanical motor operation, the electrical current provided to load 80 by rotor 30 rotation via winding 41b operates as an electrical power generator 24 concurrently. It should be further understood that in lieu of or addition to power application via source 72, mechanical power may be input to system 20 by applying mechanical rotatory power (torque) to shaft 38. Turning rotor 30 in this manner need not be timed with detector 58 or the like—still providing power to loop 54 to correspondingly supply electrical current to load 80. In this embodiment, the rotation of rotor 30 with magnets 32 under mechanical power provides an electrical generator mode of operation—converting such mechanical power to electrical power.

Figure 2:
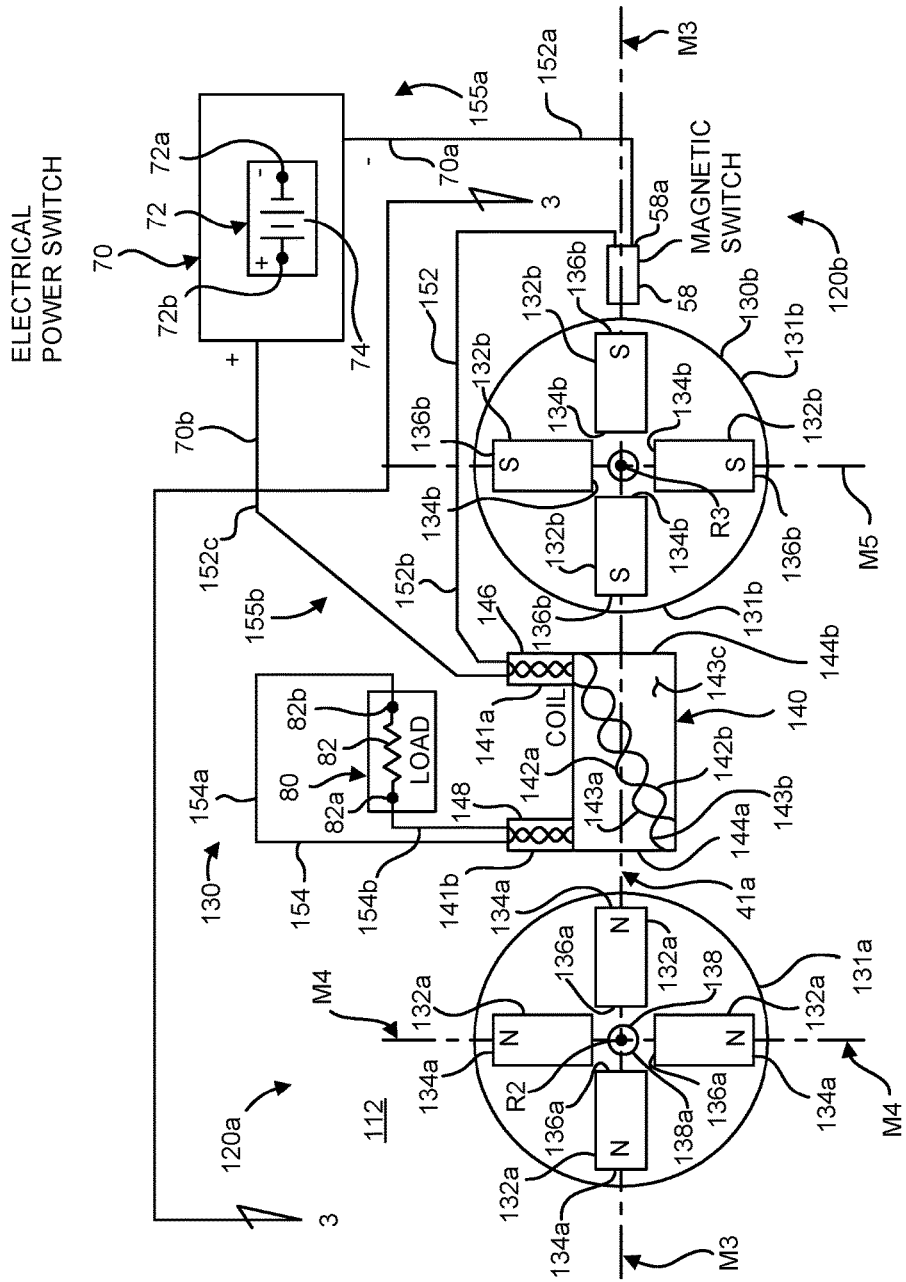
FIG. 2 is a partially schematic, top view of another electromagnetic machinery system of the present application including two permanent magnet rotors, a twisted bifilar electromagnetic coil positioned between the rotors, and associated circuitry.
Figure 3:
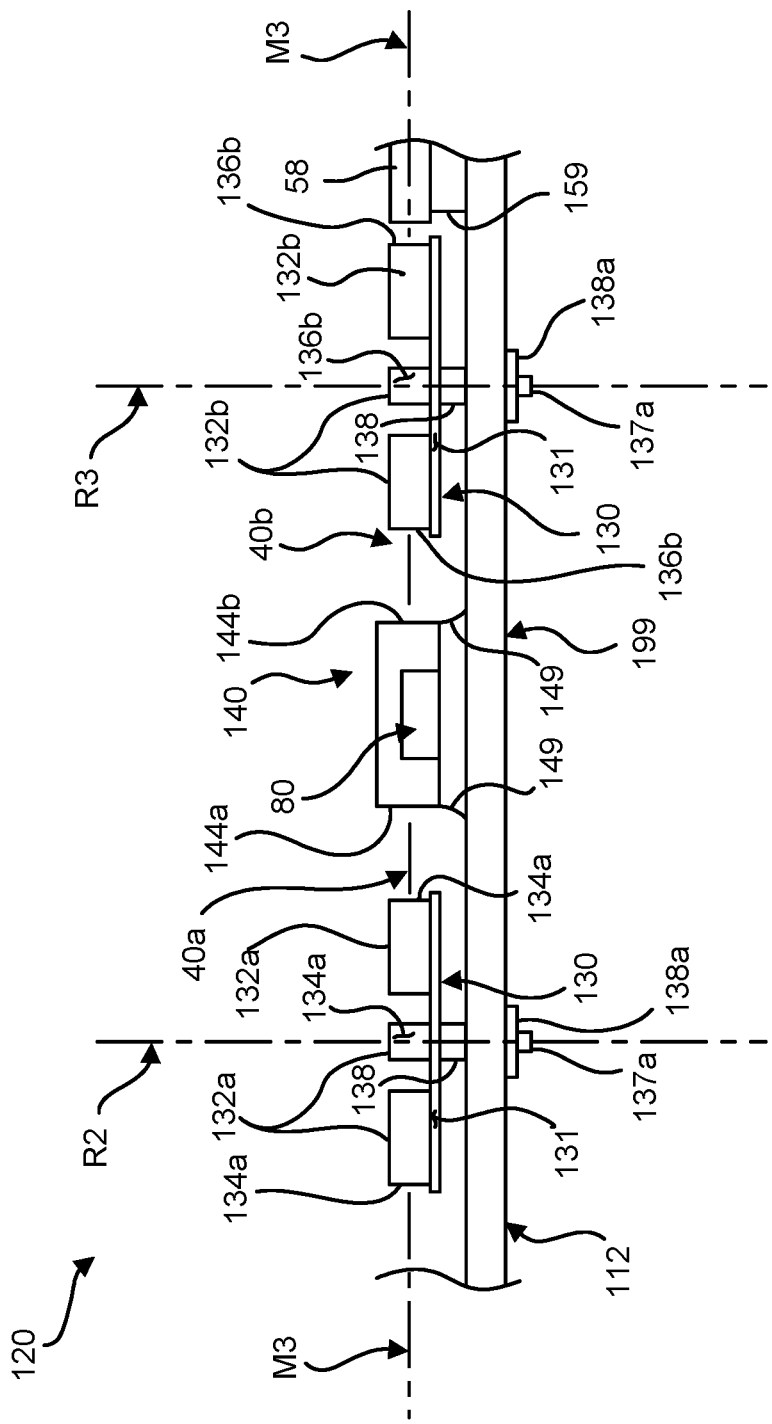
FIG. 3 is a partially schematic, side view of the electromagnetic machinery system depicted in FIG. 2 with certain aspects omitted to preserve clarity, and that corresponds to the 3-3 view line shown in FIG. 2, illustrating that the FIG. 3 view plane is perpendicular to the FIG. 2 view plane.

FIGS. 2 and 3 depict a further embodiment of electromagnetic machinery system 120 of the present application; where like reference numerals refer to like features previously described. View line 3-3 depicted in top view of FIG. 2 corresponds to the side view of FIG. 3. System 120 includes rotors 130a and 130b with generally circular, outer peripheral edges/margins 131a and 131b, respectively. Rotors 130a and 130b each include shaft 138 fixed thereto that is rotationally coupled to stator base 112 with a respective rotary bearing 138a. Rotors 130a and 130b are structured to turn about a respective rotational axis R2 and R3. In FIG. 2, axes R2 and R3 are represented by crosshairs, each extending orthogonal to the FIG. 2 view plane. FIG. 3 represents each axis R2 and R3 by a line segment of two alternating dash lengths that is coincident with the FIG. 3 view plane; where axes R2 and R3 are generally parallel to one another and extend vertically in FIG. 3. Rotors 130a, 130b are capable of rotation about respective axis R2, R3 independent of one another with acceptably low friction, heat generation, etc. Rotor 130a includes four (4) permanent magnets 132a each having a north pole N at outward pole face 134a and a south pole S at inward pole face 136a—being structured like magnets 32 of system 20. For each given magnet 132a of rotor 130a, opposing pole faces 134a and 136a each represent a planar surface parallel to the other and parallel to axis R2 (compare FIG. 2 and FIG. 3). Like the depiction of magnets 32, magnets 132a each are of an elongate bar-type extending along a different radius originating at axis R2 (a "center"). As in the case of rotor 30 and magnets 32, each adjacent pair of such radii along rotor 130a subtend an angle of approximately ninety (90°) degrees relative to the axis R2 center. Rotor 130b includes four (4) permanent magnets 132b each having a north pole N at inward pole face 134b and a south pole S at outward pole face 136b opposite the pole orientation of magnets 132a, but otherwise configured the same as rotor 30 and rotor 130a with comparable 90° radial spacing/separation shown for each. For a given magnet 132b of rotor 130b, opposing pole faces 134b and 136b each represent a planar surface parallel to the other and parallel to axis R3 (compare FIG. 2 and FIG. 3).

Magnets 132a and 132b each can be structured generally the same from one to the next in terms of size, shape, quantity, spatial orientation relative to the respective rotor 130a and 130b, one another, or any of the previously described forms/variations of any of magnets 32. Like the depiction of magnets 32, magnets 132a, 132b each include a permanent magnetic material composition for the embodiment depicted in FIGS. 2 &3. Also, like magnets 32 of system 20, such characteristics of magnets 132a, 132b may vary in certain other embodiments in the same or different ways (not shown). In certain embodiments, magnets 132a, 132b are fixedly connected to the respective rotor 130a, 130b using any of the techniques previously described for the interconnection of rotor 30 and magnets 32; either rotor 130a, 130b can be comprised of the same or a different material relative to rotor 30; and can otherwise vary in any of the ways previously described therefor. Moreover, like the depicted embodiment of rotor 30, the illustrated embodiment of rotor 130a and 130b lacks any form of additional magnetically active device in between or otherwise oriented relative to magnets 132a and 132b, respectively; however, in some other embodiments may include one or more magnetically active devices (not shown).

FIG. 2 represents magnetic axes M3, M4, and M5 as straight line segments each with an alternating dashed line pattern of two different dash lengths that is coplanar/coincident with the FIG. 2 view plane. Magnetic axes M3, M4, and M5 each provide a relational reference pertinent to selected aspects of the geometry, spatial orientation, and electromagnetic properties of system 120, among other things. On a per magnet-basis, magnetic axes M3, M4, and M5 each correspond to a magnetic dipole model idealization as in the case of magnetic axes M1 and M2 previously discussed. Axis M3 extends horizontally across FIGS. 2 and 3 relative to the alphanumeric printing presented thereon; where the side view of FIG. 3 corresponds to the view line 3-3 depicted in the top view of FIG. 2 (i.e. view planes of FIGS. 2 and 3 are mutually perpendicular). Axis M3 corresponds to the longitudinal centerline of the two horizontally-extending magnets 132a of rotor 130a and with the longitudinal centerline of the two horizontally-extending magnets 132b of rotor 130b. Correspondingly, axis M3 is approximately perpendicular to the respective pole faces 134a, 136a of each of the two horizontally-oriented magnets 132a, and the respective pole faces 134b, 136b of each of the two horizontally-oriented magnets 132b. As best shown in FIG. 2, axis M3 simultaneously coincides with the longitude of a total of four (4) permanent magnet devices (two of magnets 132a and two of magnets 132b). Magnetic axis M4 is coincident with the vertically-oriented longitudinal centerline of each of the two like-aligned magnets 132a of rotor 130a, and magnetic axis M5 is coincident with the vertically-oriented longitudinal centerline of each of the two like-aligned magnets 132b of rotor 130b. Axes M4 and M5 are coincident with the FIG. 2 view plane (being mutually parallel), but are absent in the FIG. 3 side view because both are perpendicular to the view plane thereof. In comparison, axis M3 is perpendicular to both axes M4 and M5 and is parallel to the FIG. 3 view plane. Axis M4 is approximately perpendicular to the opposing pole faces 134a and 136a of each of the two vertically-oriented magnets 132a, and the opposing pole faces 134b and 136b of each of the two vertically-oriented magnets 132b. As best shown in FIG. 2, axes M4 and M5 each simultaneously coincides with the longitude of two (2) magnets 132a of rotor 130a and of two (2) magnets 132b of rotor 130b, respectively.

As depicted in FIGS. 2 and 3, system 120 further includes electrically-controlled magnetically active device 140 positioned between rotors 130a and 130b. Device 140 is spaced apart from rotors 130a and 130b by airgaps 41a and 41b, respectively. For illustrative purposes, magnetic axis M3 horizontally spans across both of rotors 130a and 130b from the leftmost magnet 132a of rotor 130a to the rightmost magnet 132b of rotor 130b, and correspondingly extends along the longitude of magnetically active device 140 positioned therebetween—recognizing that magnetic axis M3 corresponds to an idealized dipole model at the individual magnet/device level (i.e. an ideal dipole model of each of magnets 132a, magnets 132b, and device 140 while, in effect, being electromagnetically isolated from one another and any other active magnetic device). Device 140 is fixed to stator base 112 by stator support 149 thereof to maintain spacing from rotors 130a and 130b. Stator support 149 can be an assembled or integral constituent portion of stator base 112; where each has generally the same composition. Such composition may include any substance, composite material, or combination of various substances suitable for the intended application, implementation, use, operation, etc. of system 120. For certain embodiments, some or all of either the stator base 112, the stator support 149, or both are diamagnetic or paramagnetic without any permanent magnetic material substance included that can, for example, be non-negligibly magnetized by any other constituent of system 120.

Device 140 is a form of electromagnet 141 that primarily generates magnetism by controlling/directing electric charge flow (electrical current) along a predefined pathway (as opposed to a magnetically active device with magnetic field generation being intrinsic to its permanent magnetic material composition—such as magnets 32, 132a, and 132b). Device 140 includes twisted bifilar coil 142 with two conductors 143a and 143b each wound about core 143c in a parallel manner for a quantity of turns selected to provide desired electromagnetic characteristics. Correspondingly, conductors 143a and 143b define windings 142a and 142b, respectively. Electrical conductors 143a and 143b are each of approximately the same composition, size, and shape; and are uniformly spaced apart from one another with appropriate electrical insulation therebetween to track each other in parallel. In other embodiments (not shown), conductors 143a and 143b may differ from each other in terms of composition, size, shape, relative spacing, geometry, spatial orientation, electrical insulation, or the like; or any of the forgoing such characteristics may vary between different portions of the same one of conductors 143a and 143b. Conductor composition can be composed of an elemental metal with only minor impurities at most, but more typically includes one or more metallic alloys (e.g. a solid copper alloy wire) with low electrical resistivity and other characteristics suitable for the intended application. In yet other embodiments, this composition includes an electrically conductive composite formed of two or more different substances that may be homogeneously mixed together or inhomogeneously combined in one or more respects (such as the inhomogeneity provided by differently composed layers of a multilayer composite, differently composed strands of a multi-strand wire conductor, a metallic trace carried on an isolative substrate—like printed wiring made with photolithographic techniques, or the like). In certain applications, a given composite may be selected to provide one or more corresponding anisotropic characteristics. Without limitation, various electrically conductive composites may include carbon nanotubes, a different conductive carbon allotrope, a thermoset or thermoplastic organic polymer substance with at least one electrically conductive particulate or colloidal filler, electrically conductive nanoparticles of at least one substance on/in a substrate or other carrier of at least one different substance, etc.). While in some embodiments the selected conductor composition may be in the solid state under nominal operating conditions, in other embodiments some or all of such composition is in a different phase or a combination of phases/states. In yet a further embodiment, conductors 143a and 143b are each comprised of a superconducting material that operates with virtually no electrical resistivity (or at most only a negligible amount of electrical resistivity) by maintaining appropriate conditions pertinent to superconductivity (like material temperature, pressure, etc.) with auxiliary equipment (not shown). In one form of this embodiment, this equipment includes coolant, a coolant reservoir, conductor cooling jacketing, a heat exchanger, interconnecting conduits as appropriate, etc. (not shown). Alternatively or additionally, one or both of conductors 143a and 143b are structured from multiple constituents assembled together to operate as intended (the aforementioned superconductor embodiment being just one example). In certain embodiments, conductors included in either or both of windings 41a and 41b (see FIG. 1) vary compositionally, structurally, or in another manner as described for conductors 143a and 143b hereinbefore. Core 143c may be iron, ferrite, another permanent magnetic material, air (absent), a paramagnetic material, a diamagnetic material, a combination of two or more of the forgoing, or such other composition as would be known to those of ordinary skill in the art—to name a few representative examples. In one embodiment, core 143c is comprised of a paramagnetic substance selected to better direct magnetic flux when coil 142 has an electrical current flowing therethrough, but without any non-negligible residual/persistent magnetism after the electrical current flow through coil 142 stops. In still another embodiment, core 143c is formed from one or more permanent magnetic materials. For the indicated twisted bifilar structure, electrical conductors 143a and 143b are wound about core 143c for the requisite quantity of turns to generally advance together in parallel with uniformity to form corresponding windings 142a and 142b. As bifilar coil 142 is wound/coiled, conductors 143a and 143b translationally advance together along axis M3 while also twisting about one another a selected number of times per unit length in a uniform manner (i.e. structuring of both conductors 143a and 143b with the same helical progression about core 143c in resemblance of a double helix). Winding 142a terminates with end portion 141a that defines power control interconnection conductor pair 146 and winding 142b terminates with end portion 141b that defines load power interconnection conductor pair 148. As an electrical current flows through a conductor 143a of winding 142a (with selected properties like composition, electrical conductivity, etc.); winding 142a cooperates with core 143c (with selected properties like composition, shape, etc.), to generate a magnetic field with a strength, a spatial field pattern, and other characteristics suitable for its intended implementation, purpose, use, application, or the like. The resulting magnetic field of device 140 has magnetic poles at opposite pole end faces 144a and 144b of device 140 that are generally collinear with axis M3. The specific north or south (N or S) identity of the opposing poles of device 140 (coil 142) varies with the presence and direction of electric current flowing through coils 142a and 142b, among other things. In the depicted embodiment of FIGS. 2 and 3, pole end face 144a is north N and pole end face 144b is south S. For this embodiment, the depicted polarity of magnet 132a closest to pole end face 144a (being spaced apart from each other just by air gap 41a) is also north N so they repel one another as two like north N poles in close proximity. Likewise, the depicted polarity of magnet 132b closest to pole end face 144b (being spaced apart from each other just by air gap 41b) also results in repulsion because of the two like south S poles in close proximity. The repulsion of both rotors 130a and 130b relative to device 140 is sufficient to provide for the controlled rotation of each of rotors 130a and 130b in a motor mode of operation—as will be further explained hereinafter.

However, circuitry 150 of system 120 is further described first. Circuitry 150 is electrically connected to device 140 via power control interconnection conductor pair 146 and load power interconnection conductor pair 148. Circuitry 150 includes power control loop 152 and load power loop 154 comparable to loop 52 and loop 54 of circuitry 50, respectively. Circuitry 150 of system 120 is described via a lumped element electrical network model in much the same manner as circuitry 50 of system 20. Circuitry 150 includes electrical branches collectively designated by reference numeral 155a in general (but each more specifically described as various circuit elements of loops 152 and 154 hereinafter), and electrical nodes collectively designated by reference numeral 155b in general. Nodes 155b each electrically interconnect two or more branches 155a. Nodes 155b of power control loop 152 are more specifically designated by reference numerals 152a, 152b, and 152c; and nodes 155b of load power loop 154 are more specifically designated by reference numerals 154a and 154b. In one form, these nodes 155b are each made of a metallic wire core material (e.g. copper, aluminum, alloys thereof, or the like), that is covered by electrical insulation except at opposing ends where electrical contact is made. In another form, at least some of nodes 155b are in the form of electrically conductive metal traces defined on an insulating substrate using photolithography techniques; where the substrate also carries the circuit components defining electrical branches 155a. Power control interconnection conductor pair 146 electrically couple winding 142a (conductor 143a) to power control loop 152 via its constituent electrical nodes 152b and 152c, and load power interconnection conductor pair 148 electrically couple winding 142b (conductor 143b) to load power loop 154 via its constituent electrical nodes 154a and 154b.

Accordingly, winding 142a is an electrical branch 155a in loop 152 and winding 142b is an electrical branch 155a in loop 154. Power control loop 152 includes another branch 155a more specifically designated as power source device 70 that is electrically coupled in loop 152 between electrical nodes 152a and 152c. Device 70 includes DC source 72 in the form of an electrochemical cell battery 74 and correspondingly provides a flow of electric current through loop 152 when it is in a closed circuit state. Battery 74 has internal negative and positive terminals 72a and 72b corresponding to external device terminals 70a and 70b connected to nodes 152a and 152c, respectively. Another branch 155a of loop 152 is magnetic field detector 58 electrically coupled between nodes 152a and 152b. Detector 58 includes "normally open" magnetic switch 58a responsive to a magnetic field in close proximity thereto (like that from the closest, rightmost magnet 132b of rotor 130b aligned with detector 58 along magnetic axis M3 in FIG. 2). Both device 70 and detector 58 have been previously described in connection with system 20 of FIG. 1 each as a contributing electrical branch of loop 52. However, it should be appreciated that system 120 as depicted in FIGS. 2 and 3 lacks power switch device 60 of system 20.

In operation, the magnetic field from this rightmost magnet 132b in FIG. 2 is of sufficient magnitude/strength to cause magnetic switch 58a of detector 58 to change from the open circuit state to the closed circuit state—resulting in closure of power control loop 152 until rotation of rotor 30 moves it far enough away from detector 58 for its magnetic switch 58a to return to the open state (so that loop 152 returns to open circuit status). In the FIG. 2 depiction, switch 58a is closed, and detector 58 aligns with the magnetic axes of both device 40 and the rightmost magnet 132b of rotor 130b closest to detector 58 (such magnetic axes being depicted as the same with the M3 designation). This alignment can be characterized as having no effective difference (zero degree (0°) separation) or equivalently as a one hundred eighty degree (180°) separation in contrast to the right angle (90°) separation between magnetic axis M1 along device 40 and magnetic axis M2 of the uppermost magnet 32 closest to detector 58 in system 20 of FIG. 1. Returning to system 120 of FIG. 2, while a magnetic field from one of magnets 132b of rotor 130b is within range of detector 58 at a sufficient magnitude, the circuit of loop 152 remains closed so that electric current supplied by device 70 continues to flow through winding 142a of bifilar coil 142—providing a magnetically active state. However, the magnetic polarity of device 140 causes both rotors 130a and 130b to turn, moving away the magnet 132b of rotor 130b closest to detector 58 so that its magnetic field strength progressively weakens in the vicinity thereof until detector 58 responds by opening the circuit of loop 152 to change to an open circuit state (alternatively designated a magnetically inactive state). Both rotors 130a and 130b continue to turn such that another magnet 132b of sufficient magnitude moves close enough to detector 58 to cause loop 152 to change back to a closed circuit state again. Alternation between the open circuit state and closed circuit state of loop 152 (and correspondingly the magnetically active/inactive states) continues with the rotation of rotors 130a and 130b of system 120—exhibiting a time-varying electrical and magnetic behavior that can correspond (at least in part) to rotational speed of the rotor 130b subject to detector 58 in terms of electric current, voltage, magnetic field strength, magnetic field pattern, and the like previously described for system 20. However, there are several distinctions worthy of consideration. For instance, system 120 includes two rotors 130a and 130b, the alignment of detector 58 relative to device 140 of system 120 differs from that of detector 58 and device 40 of system 20, and the bifilar coil of device 40 (system 20) lacks certain specifics of coil 142 of device 140 (system 120)—namely twisting of conductors 143a and 143b of coil 142 about each other. In another instance, the arrangement of rotors 130a and 130b at opposite ends of device 140 utilizes both generated magnetic poles of device 140 at the same time when operating each of rotors 130 and 130b as a motor 120a (motor mode of operation; e.g. turning each rotor 130a and 130b by magnetic interaction with a different one of the opposing poles of device 140). In various other embodiments of the present application, one of system 20, 120 can be adapted to additionally or alternatively utilize one or more features of the other. For instance, system 20 can incorporate the twisted bifilar coil 142 of system 120 in place of the bifilar coil of device 40, or system 120 can include a power switch device 60 of system 20 (or any of its described variants) in loop 152.

Specific to load power loop 154 of circuitry 150, winding 142b is a constituent electrical branch 155a of loop 154 that is electrically interconnected by nodes 154a and 154b. Load 80 is another constituent electrical branch 155a of loop 154 electrically coupled opposite (or in parallel with) winding 142b between nodes 154a and 154b—as previously described in connection with system 20 of FIG. 1. As depicted, load 80 is a two-terminal device including electrically resistive load device 82 with electrical contacts 82a and 82b electrically coupled to nodes 154b and 154a, respectively. Winding 142b includes multiple turns about core 143c of a quantity suitable to generate a sufficient electrical current through loop 154 by magnetic induction as either or both of rotors 130a and 130b turn—causing an interaction between the magnetic fields of magnets 132a and 132b and winding 142b. Correspondingly, the electrical current induced in winding 142b provides electrical power to load 80. In regard to certain further operational aspects of system 120, in some instances the description refers to various embodiments that differ operationally, compositionally, and/or structurally—where, such differences may be explained, in part or in whole, by referral to certain operational hypotheses, theories, modeling, expected steady state and transient state modalities, empirical observations, or the like. For instance, in some embodiments coil 142 or other components of circuitry 150 are subject to inductive-kick for which circuitry 150 is structured to include one or more devices (not shown) to provide suitable protection for the same as previously described in connection with system 20 of FIG. 1. It should be appreciated that in further embodiments, loop 152, loop 154, or any component or constituent thereof may be subject to a controller with operating logic as previously described for system 20 (not shown). Likewise, a controller (not shown) may exert other regulation relative to the output of device 70—like providing constant DC voltage, constant DC current, time-varying AC power at a fixed frequency over a predefined voltage and current ranges, a particular time-varying waveform (e.g. sinusoidal, triangular, saw tooth, impulse, square, pulse width (fixed or variable)), or AC power with frequency that varies in a predefined manner. In the depicted embodiment, both windings 142a and 142b follow approximately the same path parallel to each other; generally each have the same electrical conductor size, shape, and composition; and have about the same number of turns about core 143c. However, in other embodiments (not shown) windings 142a and 142b may vary from one another in terms of the number of turns; conductor size, shape, or composition; spatial relationship to each other; etc.—just to name a few possibilities. In one embodiment with non-negligible higher order magnetic/ electric field effects, the induced electricity in winding 142b may be a complex, time-varying waveform in terms of electrical current/voltage that exhibits at least some degree of periodicity in correspondence to the ninety degree (90°) angular spacing of magnets 132a and 132b and the speed of rotation of rotor 130a,130b, or both. In other embodiments, the magnet 132a quantity carried by rotor 130a differs relative to the magnet 132b quantity carried by rotor 130b, the rotational position of magnets 132a relative to magnets 132b differs such that no simultaneous alignment of two (2) horizontal magnets 132a, two (2) horizontal magnets 132b, device 140, and detector 58 along axis M3 takes place (unlike the embodiment of system 120 depicted in FIGS. 2 and 3), or the size, shape, spatial distribution, or composition of magnets 132a relative to magnets 132b differ from one another.

In certain embodiments the electrical power provided by induction to load 80 is of a complex, time-varying type that depends (at least in part) on rotational speed of any rotor(s) of the system (e.g. 20 or 120). For either system 20 or 120, in some embodiments with two windings about the same core, a non-negligible degree of "cross-induction" between them results. For instance, the changing (e.g. building or collapsing) magnetic field generated by the first winding induces electricity in a second winding; and in response, the magnetic field generated by the second winding as a result of this induction changes (builds or collapses) in such a manner that the second winding induces some level of electricity in the first winding, and so on. Such cross-induction can contribute to the complexity, shaping, magnitude, etc. of the resultant electric power or electric signal and its waveform—for either of the windings. In some embodiments of system 20 or 120, load 80 includes certain circuitry or other equipment suitable to provide electrical power that is regulated to a constant voltage, a constant current, an Alternating Current (A.C.) output with a periodic waveform (sinusoidal, saw tooth, impulse, triangular, square, variable or fixed pulse width, any type of information bearing signal format/modulation, etc.) at a fixed frequency or with a frequency that varies in accordance with a predefined pattern or schedule, a different form of electric power, or other electric signal type that is generated by converting electricity provided from winding 142b by induction. Alternatively or additionally, load 80 can present a fixed or varying degree of electrical impedance that may be pure resistance, pure reactance, or an intermediate combination of both in certain other embodiments. It should be recognized that mechanical rotary power or torque is generated by rotation of rotor 30 for system 20; or rotation of rotor 130a, 130b, or both for system 120, and each corresponding shaft 38 (system 20) or 138 (system 120). In certain applications, this mechanical rotary power can be utilized to drive one or more other system constituents e.g. cams, gears, torque converter, a crank with or without translationally reciprocating members, or may otherwise be converted to a different form of power (not shown). Yet other embodiments of the present application (system 20 or system 120) are configured with multiple windings about the same core that are not of a bifilar form. In certain variants thereof, at least one winding turns about the core in a rotational direction opposite that of another; the windings have different compositions; the windings are differently sized/shaped in terms of conductive cross-section (gauge) or length; the windings differ in the quantity of turns about the core, there are twisted and untwisted windings co-wound about the same core, or the like.

In addition to this electromechanical operation of system 120 as a motor 120a, the electrical current provided to load 80 by rotation of rotor 130a, 130b or both via winding 142b operates as an electrical power generator 120b concurrently. It should be further understood that in lieu of or addition to power application via device 70, mechanical power may be input to system 120 by applying mechanical rotary power (torque) to shaft 138. In some embodiments, turning rotor 130a, 130b, or both in this manner need not be timed with detector 58 of system 120 or the like—still providing power to loop 154 to correspondingly supply electrical power to load 80. In this embodiment, the rotation of rotor 130a, 130b, or both by application of rotary mechanical power provides an electrical generator mode of operation—converting such mechanical power to electrical power in the form of generator 120b.

FIGS. 4-6 depict various side views of electromechanical machinery system 220 of still another embodiment of the present application. FIG. 5 is a partial cross-sectional side view corresponding to view line 5-5 in FIG. 4, and FIG. 6 is a partial cross-sectional side view corresponding to view line 6-6 in FIG. 4. The FIG. 5 and FIG. 6 view planes are parallel to each other and perpendicular to the FIG. 4 view plane. FIGS. 5 and 6 each include view line 4-4 in correspondence to the view of FIG. 4. System 220 includes permanent magnet rotors 330a and 330b that are each generally circular with peripheral edge/margin 331a and 331b, respectively. Rotor 330a includes permanent magnets 332a and rotor 330b includes permanent magnets 332b. Magnets 332a, 332b are fixed to the corresponding rotor 330a, 330b to be carried therewith using any of the interconnection techniques previously described in connection with systems 20, 120 of FIGS. 1-3 and are comprised of permanent magnetic material (previously defined) as also previously described. Other than magnets 332a and 332b, rotors 330a and 330b may be comprised of any material(s) previously described for systems 20 or 120, or as would otherwise be known to those of ordinary skill in the art.

System 220 further includes stator 349. Stator 349 includes stator base 399, vertically-extending stator coil supports 349a and 349b, vertically-extending stator shaft mounts 379a and 379b, and stator support interface 349c. Base 399, supports 349a, 349b; mounts 379a, 379b, and interface 349c are all constituents of stator 349 that are rigidly fixed together, each either as an integral portion of the whole (stator 349) or by assembly from separate parts/pieces using any interconnection technique previously described, or such other techniques as would be known to those of ordinary skill in the art. Stator 349 may be comprised of any material(s) previously described for stators of systems 20 or 120 or portions thereof, or as would otherwise be known to those of ordinary skill in the art. Rotors 330a and 330b are fixed to shaft 338 to turn therewith about rotational axis R4 (R4 is represented by crosshairs in FIGS. 5 and 6 because it is perpendicular to the respective view planes thereof). The rotor/shaft interconnection is provided by a press-fit key slot arrangement 338a (best shown in FIG. 5) that may be supplemented or replaced by one or more other connection/joining techniques, such as an adhesive bond, mechanical fasteners, or the like (not shown). Shaft 338 terminates with opposing rotary bearing hubs 339a and 339b coupled to shaft mounts 379a and 379b, respectively. Shaft 338 extends through rotary shaft bearings 389a and 389b in coil supports 349a and 349b (best shown in FIG. 6), respectively. Each bearing 389a and 389b is mounted in a corresponding stator aperture 390. Shaft 338 turns about axis R4 with rotors 330a and 330b fixed thereto relative to rotary shaft bearings 389a and 389b and stator 349 (including all stator 349 constituents).

Magnets 332a each include a generally planar, inwardly-directed pole face 336 with a south S polarity (best shown in FIG. 4) and magnets 332b each include a generally planar, inwardly-directed pole face 334 with a north N polarity (best shown in FIG. 5). Magnets 332b of rotor 330b are evenly spaced apart from one another about the rotational center originating at rotational axis R4 (see FIG. 5). Each magnet 332a is equidistant from this center, being evenly space along the perimeter of a circle with the same center but a smaller radius so that this perimeter is equidistantly inset from edge 331a and is concentric with the circle defined by edge 331a. Correspondingly, magnets 332a correspond to different radii each originating at the same rotational center that are angularly separated from one another by the same amount—forty-five degrees (45°) for the quantity of eight (8) magnets 332a depicted in FIGS. 4 and 5. Rotor 330a and magnets 332a are configured the same as rotor 330b and magnets 332b, except that magnets 332a each have an inwardly directed south pole S instead of a north pole N like magnets 332b. In other embodiments, one or more of Magnets 332a, 332b may have a composition, size, shape, spatial orientation, or the like that differs from at least one other; or adopts any of the variants previously described for magnets 32, 132a, or 132b. In still other embodiments, the quantity of magnets 332a or 332b may differ.

System 220 further includes magnetically active device 340 in the form of bifilar coils 341 that each define a corresponding power control winding 341a and load power winding 341b (where only a few of windings 341a and 341b are schematically specified by reference numeral in FIG. 4 to preserve clarity). When an electric current flows through each power control winding 341a, coil 341 defines opposing magnetic pole faces 346 and 344, being configured so pole face 346 is of a south S polarity (and correspondingly pole 344 is of a north N polarity, but is not specifically shown with such labeling). Accordingly, the magnetic poles generated by devices at faces 346 and faces and 344 are the same as the poles of magnets 332a and 332b. System 220 includes the previously described detector 58 that remains stationary relative to rotation of rotor 330a, rotor 330b, and shaft 338. System also includes circuitry 350 that is configured the same as circuitry 50 of system 20, circuitry 150 of system 120, or any previously described variants thereof. Detector 58 is mounted to base 399 of stator 349 in a fixed manner and is positioned to respond to the magnetic field of each of magnets 332a of rotor 330a as rotor 330a rotates about axis R4 in the manner described for systems 20 and 120. The quantity of devices 340 is the same as the quantity of magnets 332a or magnets 332b for the depicted embodiment (compare FIGS. 5 and 6). Accordingly, each device 340 corresponds to one magnet 332a of rotor 330a and one magnet 332b of rotor 330b. Collectively, devices 340 and coil supports 349a and 349b are designated as stator coil subassembly 400. Subassembly 400 (including devices 340 as constituents thereof) are positioned between rotor 330a carrying magnets 332a and rotor 330b carrying magnets 332b—being spaced apart therefrom by airgaps 441a and 441b, respectively.

In operation, power control winding 341a, circuitry 350, and detector 58 operatively cooperate to provide alternating open circuit and closed circuit states (equivalently, alternating magnetically active and inactive states) to selectively provide DC electric current flow through power control windings 341a in the manner previously described in connection with loops 52 and 152 of systems 20 and 120, respectively. As rotors 330a and 330b turn, the movement of magnets 332a and 332b relative to devices 340 selectively generates electric power in coils 341b by magnetic induction that is operable to provide electric power to a load included in circuitry 350 (not shown) in the manner that load 80 is supplied in connection with systems 20 and 120 of FIGS. 1-3 previously described—including the previous description of all variants and alternatives thereof. As one of magnets 330a and one of magnets 330b align with a device 340 therebetween, the magnetic axis of each of these magnetically active devices is represented by a corresponding magnetic alignment axis M5 through M12; where only axes M5 and M6 are shown in FIG. 4 to preserve clarity, and axes M5-M12 are represented by crosshairs in FIGS. 5 and 6 because they are each perpendicular to the view planes thereof. Like the configurations of system 20 and 120 in FIGS. 1-3, the pole faces 336 of magnets 332a and the pole faces 346 of devices 340 are of a like type (south S poles) and the pole faces 334 of magnets 332b and the pole faces 344 of devices 340 are of like type (north N poles)—providing a magnetic field arrangements the repel one another to result in rotation of rotors 330a and 330b relative to stator 349, assembly 400, detector 58, etc. in a manner similar to that of systems 20 and 120 of FIGS. 1-3.

Next, certain information is provided as a transition to any claims that follow to promote a better understanding thereof. While this transition addresses subject matter particularly pertinent to the claims, it equally applies to the entirety of the present application unless subject to an unambiguous explicit exception to the contrary. Any experiment, theory, thesis, hypothesis, idealization, mechanism, empirical activity, example, model, proof, belief, suggested operating mode/behavior, speculation, conjecture, guesswork, discovery, investigation, finding, or other like information is provided to enhance comprehension of the present application without imposing restriction of any claim or invention otherwise described herein to the same, except to the extent expressly recited otherwise therein. Also, the description of the present application may include liberal use of the term "embodiment" or synonymous terminology. Any embodiments of the present application set forth herein are representative only. Correspondingly, any advantages, apparatus, applications, arrangements, aspects, attributes, benefits, characterizations, combinations, components, compositions, compounds, conditions, configurations, constituents, designs, details, determinations, devices, discoveries, elements, embodiments, examples, exchanges, experiments, explanations, expressions, factors, features, forms, formulae, gains, implementations, innovations, kits, layouts, machinery, materials, mechanisms, methods, modes, models, objects, options, operations, parts, processes, properties, qualities, refinements, relationships, representations, species, structures, substitutions, systems, techniques, traits, uses, utilities, variants, or the like that come within the spirit, scope, or meaning of any claim that follows or invention otherwise described herein, are desired to be protected. Any two embodiments of the present application differ if at least one aspect differs between them. A reference to an embodiment herein need only explicitly include association with a given aspect once, where such association may be implicit for any other specific, unambiguous reference to the same embodiment. Moreover, an aspect expressly associated with one embodiment may or may not be associated with any other embodiment unless described to be so.

No claim hereof should be understood to include a "means for" or "step for" performing a specified function (means/step plus function) unless signaled by expressly reciting "means for . . . " or "step for . . . " before description of this function in the same patent clause. Representative embodiments in the foregoing description and other information in the present application can be organized under one or more different headings/subheadings. Such headings or subheadings go to the form of the application only except for any Claim heading or subheading preceding patent claim content of the present application. Any other headings or subheadings are not intended to limit scope or meaning of any embodiments, inventions, or description set forth herein, including any claims that follow. The terminology especially, extraordinary, favor, favored, favorable, favorite, important, imperative, critical, crucial, considerable, marked, momentous, paramount, principal, significant, substantial, special, specialty, vitality, prefer, preferred, preferable, preference; an adjective, adverb, noun, verb, comparative, superlative, gerund, or participle form thereof (to the extent it exists); or other wording synonymous to any of the foregoing may be used to indicate an embodiment, feature, or aspect thereof is desirable. While such terminology may indicate variation in the degree of desirability of an embodiment, feature, or aspect set forth herein; or establish a desired ranking or order for different embodiments, features, or aspects, the content of any following claim or invention otherwise described herein only includes such variation in desirability, or desired ranking or ordering, to the extent it unambiguously recites the same. Further, this terminology does not designate an embodiment, feature, or aspect is the only desirable one or the most desirable one unless accompanied by language to unambiguously reflect the same.

Whether a claim is of a method, process, product-by-process, composition of matter, or apparatus type tends to direct the proper form and structure of the claim language—especially the claim transition and claim body; where all features or elements recited in the claim body must exist, happen, be satisfied or otherwise performed to result in claim coverage/protection thereof. As used herein, it should be recognized that each claim that follows is of the "open claim" type such that it applies to any instance where all the elements recited therein are present, satisfied, performed, or the like—even if such instance includes one or more additional features, elements, aspects, or the like. In contrast, a "closed" or "partially closed" claim is signaled by reciting "consists of" or "consisting of" in the claim transition passage, which usually prevents application to any instance with additional features, elements, aspects, etc. Instead, an open claim transition recites a form of the verb "comprise," "include," "contain," "define," or the like (usually the gerund). For avoidance of doubt, occurrence of any of these verbs or any inflection, gerund, phrase, infinitive verb form, or the equivalent in the claim transition should be understood to be of an open claim type with respect to all elements of the claim body. Except to the extent an open claim explicitly states to the contrary, recitation of a claim term in: (a) the singular (e.g. by indefinite article association) means one or more thereof, (b) the plural (e.g. "plurality of . . . " or with no indefinite article) means greater than one thereof, and (c) a specific quantity means such quantity or any greater quantity thereof.

For a method or process claim of the open type, the claim body often organizes content as multiple elements each identified by a gerund, an infinitive verb form, or equivalent expression/substitution. Absent an unambiguous indication to the contrary, such method claim features may be performed in any order or sequence, and any two or more of the same may be performed concurrently or overlapping one another. This flexibility is not precluded because of: (a) recitation in the claim of one element before another, (b) designation of one occurrence of the element with a number, indefinite article, or no (zero) article determiner with one or more subsequent occurrences a definite article determiner, or (c) the claim includes alphabetical, cardinal number, or roman numeral labeling to improve readability, organization, or the like without any express indication such labeling intends to impose a particular order. In contrast, to the extent there is an intention to limit a method/process claim to a particular order or sequence of performance: (a) ordinal numbers (1st, 2nd, 3rd, etc.) or corresponding words (first, second, third, etc.) shall be expressly used to specify the intended order/sequence of corresponding method claim features; and/or (b) when an earlier listed feature is referenced by a later listed feature and a relationship between them is of such a type that imposes a relative order because a result of the performance or happening of the first occurring element is necessary for rational performance/happening of the later element, a different order increases claim ambiguity, the claim language establishes a scheduling/timing relationship inconsistent with a proposed order of performing/happening of the claim elements, and/or a specifically applicable claim construction principle supports an order of the earlier element before the later element. However, to the extent claim construction imposes that one feature be performed before another, the mere ordering of less than all the elements does not impose an order on any other elements listed before, after, or between them.

No claim that follows should be understood to include a "means for" or "step for" performing a specified function that incorporates any structure, material, or act described anywhere in the patent application as performing such function—unless signaled by expressly reciting "means for . . . " or "step for . . . " before description of this function in the same patent clause. Representative embodiments in the foregoing description and other information in the present application possibly may appear under one or more different headings/subheadings. Such headings or subheadings go to the form and organization of the application only except for any Claim heading or subheading preceding patent claim content of the present application. Any other headings or subheadings which, while perhaps aiding the reader, are not intended to limit scope or meaning of any embodiments, inventions, or description set forth herein, including any claims that follow. Only representative embodiments have been described, such that: advantages, apparatus, applications, arrangements, aspects, attributes, benefits, characterizations, combinations, components, compositions, compounds, conditions, configurations, constituents, designs, details, determinations, devices, discoveries, elements, embodiments, examples, exchanges, experiments, explanations, expressions, factors, features, forms, formulae, gains, implementations, innovations, kits, layouts, machinery, materials, mechanisms, methods, modes, models, objects, options, operations, parts, processes, properties, qualities, refinements, relationships, representations, species, structures, substitutions, systems, techniques, traits, uses, utilities, and/or variations that come within the spirit, scope, and/or meaning of any inventions defined and/or described herein, including any claims that follow, are desired to be protected.

The invention claimed is:

1. A method for power conversion, comprising the steps of:
    generating a drive current in a first winding of an electromagnet in a motor mode that converts an input electrical power to an output mechanical power, wherein (i) said electromagnet (a) is mounted spatially proximate a rotor and (b) has a bifilar coil, (ii) said bifilar coil has a pair of conductors that form said first winding and a second winding and (iii) said second winding is (a) spatially parallel to said first winding, (b) spatially separated from said first winding and (c) electrically isolated from said first winding and (iv) said rotor (a) is rotatably mounted and (b) has a plurality of permanent magnets;

rotating said rotor in response to said drive current in said motor mode;

removing said drive current from said first winding in a generator mode that converts an input mechanical power to an output electrical power; and inducing a load current through said second winding to an electrical load in response to a torque applied to said rotor in said generator mode.

2. The method according to claim 1, wherein a north-south magnetic polarity of each of said permanent magnets has a magnetic axis having a dominant component approximately perpendicular to an axis of rotation of said rotor.

3. The method according to claim 1, wherein (i) an additional rotor having a plurality of additional permanent magnets is rotatably mounted proximate said electromagnet and (ii) said additional permanent magnets have a magnetic pole orientation reversed relative to said permanent magnets of said rotor.

4. The method according to claim 3, wherein (i) said electromagnet is positioned between said rotor and said additional rotor and (ii) said electromagnet has an another north-south magnetic polarity orientation along a magnetic axis having a dominant component approximately parallel to a common rotational axis of said rotor and said additional rotor.

5. The method according to claim 1, wherein said first winding and said second winding are twisted together.

6. The method according to claim 1, further comprising the steps of:

generating said drive current in said first winding in a dual mode that converts said input electrical power to said output electrical power;

rotating said rotor in response to said drive current in said dual mode; and inducing said load current in said second winding to said electrical load concurrently with said drive current flowing in said first winding in said dual mode.

7. An apparatus comprising:

a rotor (i) rotatably mounted to a base and (ii) having a plurality of permanent magnets;

a electromagnet (i) mounted to said base spatially proximate said rotor and (ii) having a bifilar coil, wherein (a) said bifilar coil has a pair of conductors that form a first winding and a second winding and (b) said second winding is (1) spatially parallel to said first winding, (2) spatially separated from said first winding and (3) electrically isolated from said first winding; and a control circuit electrically connected to said first winding, wherein (i) in a motor mode that converts an input electrical power to an output mechanical power (a) said control circuit is configured to generate a drive current in said first winding and (b) said rotor is configured to rotate in response to said drive current and (ii) in a generator mode that converts an input mechanical power to an output electrical power (a) said control circuit is configured to remove said drive current from said first winding and (b) a load current is induced through said second winding to an electrical load in response to a torque applied to said rotor.

8. The apparatus according to claim 7, wherein a north-south magnetic polarity of each of said permanent magnets has a magnetic axis having a dominant component approximately perpendicular to an axis of rotation of said rotor.

9. The apparatus according to claim 7, further comprising an additional rotor (i) rotatably mounted to said base proximate said electromagnet and (ii) having a plurality of additional permanent magnets, wherein said additional permanent magnets have a magnetic pole orientation reversed relative to said permanent magnets of said rotor.

10. The apparatus according to claim 9, wherein (i) said electromagnet is positioned between said rotor and said additional rotor and (ii) said electromagnet has another north-south magnetic polarity orientation along a magnetic axis having a dominant component approximately parallel to a common rotational axis of said rotor and said additional rotor.

11. The apparatus according to claim 7, wherein said first winding and said second winding are twisted together.

12. The apparatus according to claim 7, wherein in a dual mode that converts said input electrical power to said output electrical power (i) said control circuit is configured to generate said drive current in said first winding to cause said rotation of said rotor and (ii) said rotation of said rotor induces said load current in said second winding to said electrical load concurrently with said drive current flowing in said first winding.

13. The apparatus of claim 7, wherein:
the electromagnet is spaced apart from an outermost peripheral margin of the rotor by an air gap.

14. The apparatus of claim 13, wherein a north pole of each of the plurality of permanent magnets is closer to the outermost peripheral margin of the rotor than a south pole of each of the plurality of permanent magnets.

15. The apparatus of claim 7, wherein:
the bifilar coil of the electromagnet is wound about a longitudinal centerline of a core of the electromagnet;
the longitudinal centerline of the core is perpendicular to a rotational axis of the rotor; and
the electromagnet has a coil face through which the longitudinal centerline passes that faces the rotor.

16. The apparatus of claim 15, wherein a north pole of each of the plurality of permanent magnets is closer to an outermost peripheral margin of the rotor than a south pole of each of the plurality of permanent magnets.

17. The apparatus of claim 15, wherein the coil face is spaced from an outermost peripheral margin of the rotor by an air gap.

18. The apparatus according to claim 7, wherein the rotor is a first rotor and the plurality of permanent magnets comprise a first plurality of permanent magnets, the apparatus further comprising:
a second rotor (i) rotatably mounted to the base proximate the electromagnet and (ii) having a second plurality of permanent magnets, wherein:
a rotational axis of the first rotor and a rotational axis of the second rotor are parallel to one another; and
each of the second plurality of permanent magnets has a magnetic pole orientation reversed relative to each of the first plurality of permanent magnets.

19. The apparatus according to claim 18, wherein:
the electromagnet is spaced apart from the first rotor by a first air gap; and
the electromagnet is spaced apart from the second rotor by a second air gap.

20. The apparatus according to claim 18, wherein:

the bifilar coil of the electromagnet is wound about a longitudinal centerline of a core of the electromagnet;

the longitudinal centerline of the core is perpendicular to the rotational axis of the first rotor and the rotational axis of the second rotor; and the electromagnet has a first pole end face through which the longitudinal centerline passes that faces the first rotor and a second pole end face through which the longitudinal centerline passes that faces the second rotor.

\* \* \* \* \*